(12) United States Patent
Voloshynovskiy et al.

(10) Patent No.: US 10,019,646 B2
(45) Date of Patent: Jul. 10, 2018

(54) METHOD FOR OBJECT RECOGNITION AND/OR VERIFICATION ON PORTABLE DEVICES

(71) Applicant: Université de Genève, Genève (CH)

(72) Inventors: Svyatoslav Voloshynovskiy, Vésenaz (CH); Maurits Diephuis, Genéve (CH)

(73) Assignee: Université de Genève, Genève (CH)

( * ) Notice: Subject to any disclaimer, the term of this patent is extended or adjusted under 35 U.S.C. 154(b) by 13 days.

(21) Appl. No.: 15/126,987

(22) PCT Filed: Mar. 9, 2015

(86) PCT No.: PCT/EP2015/025011
§ 371 (c)(1),
(2) Date: Sep. 16, 2016

(87) PCT Pub. No.: WO2015/139848
PCT Pub. Date: Sep. 24, 2015

(65) Prior Publication Data
US 2017/0109600 A1    Apr. 20, 2017

(30) Foreign Application Priority Data
Mar. 17, 2014   (EP) .................................... 14160385

(51) Int. Cl.
*G06K 9/46*     (2006.01)
*G06K 9/00*     (2006.01)

(52) U.S. Cl.
CPC ....... *G06K 9/4671* (2013.01); *G06K 9/00577* (2013.01)

(58) Field of Classification Search
CPC ............. G06K 9/00785; G06K 9/4671; G06K 9/4652; G06K 9/00335; G06K 9/4661
See application file for complete search history.

(56) References Cited

U.S. PATENT DOCUMENTS 6,021,202 A  *  2/2000  Anderson ............... G06F 17/24
                                                   705/18
7,552,120 B2     6/2009  Essafi et al.
(Continued)

FOREIGN PATENT DOCUMENTS

WO    WO 2006/120398 A1    11/2006
WO    WO 2007/028799 A1     3/2007
(Continued)

OTHER PUBLICATIONS

Lowe, David G., "Object Recognition from Local Scale-Invariant Features," *7th International Conference on Computer Vision*, (Sep. 20-27, 1999), 8 pgs.

(Continued)

*Primary Examiner* — Bobbak Safaipour
(74) *Attorney, Agent, or Firm* — Christensen, Fonder, Dardi & Herbert PLLC

(57) ABSTRACT

A method for recognition and/or verification of authenticity of digital, and/or physical objects, comprising the steps of codebook training, object enrollment, and object verification, the latter consisting in object recognition and/or object authentication. The method uses two types of features, of codebooks, and of databases, which are specifically designed for identification, respectively authentication, the identification database and authentication database having different organizations. The invention is also directed to corresponding computer program means adapted to implement the proposed method, devices adapted for implementation of a method, as well as to applications which are particularly adapted for use of the proposed method.

17 Claims, 15 Drawing Sheets

(56) References Cited

U.S. PATENT DOCUMENTS

| | | | |
|---|---|---|---|
| 7,644,281 | B2 | 1/2010 | Deguillaume et al. |
| 7,686,231 | B2 | 3/2010 | Hamilton |
| 7,965,862 | B2 | 6/2011 | Jordan et al. |
| 7,991,182 | B2 | 8/2011 | Rhoads |
| 9,799,119 | B2* | 10/2017 | Cheng ............... G06K 9/3233 |
| 9,830,531 | B2* | 11/2017 | Mikuriya ............. G06T 7/11 |
| 9,875,429 | B2* | 1/2018 | Wang ................ G06K 9/6257 |
| 2006/0279767 | A1* | 12/2006 | Lim ................. H04N 1/00846 358/1.14 |
| 2007/0286526 | A1 | 12/2007 | Abousleman et al. |
| 2009/0018990 | A1* | 1/2009 | Moraleda ........... G06K 9/00463 |
| 2009/0292701 | A1 | 11/2009 | Saoudi et al. |
| 2010/0012736 | A1 | 1/2010 | Wilds et al. |
| 2010/0329576 | A1 | 12/2010 | Tian et al. |
| 2011/0158483 | A1 | 6/2011 | Ming et al. |
| 2012/0324534 | A1 | 12/2012 | Mandridake et al. |
| 2013/0202213 | A1* | 8/2013 | Adamek ............... G06K 9/42 382/201 |
| 2015/0117701 | A1* | 4/2015 | Ross ................ G06K 9/00449 382/100 |
| 2017/0295014 | A1* | 10/2017 | Baras ................ H04L 9/0861 |

FOREIGN PATENT DOCUMENTS

| | | |
|---|---|---|
| WO | WO 2012/126008 A2 | 9/2012 |
| WO | WO 2013/163978 A1 | 11/2013 |

OTHER PUBLICATIONS

Haitsma, Jaap, et al., "Robust Audio Hashing for Content Identification," *Proc. Of the Content-Based Multimedia Indexing*, Firenze/Italy, (Sep. 2011), 8 pgs.

Zitová, Barbara, et al., "Image registration methods: a survey," *Image and Vision Computing*, vol. 21 (2003), pp. 977-1000.

den Hollander, Richard J.M., et al., "Logo recognition in video by line profile classification," *Storage and Retrieval Methods and Applications for Multimedia 2004*, SPIE vol. 5307, XP055132795, (2004), pp. 300-306.

Chatfield, Ken, et al., "The devil is in the details: an evaluation of recent feature encoding methods," *Proceedings of the British Machine Vision Conference 2011*, XP055147185, (Jan. 1, 2011), 12 pgs.

Diephuis, Maurits, "A Framework for Robust Forensic Image Identification," *Master Thesis, Univ. Twente, Univ. de Geneve*, XP055132956, Aug. 18, 2010 (164 pgs.).

Szeliski, Richard, *Computer Vision: Algorithms and Applications*, Sep. 3, 2010 draft, pp. 685-691.

\* cited by examiner

BRAND
(701)

(703)

BRAND
(702)

Lorem ipsum dolor sit amet, quis sodales erat et placerat neque, tristique amet
(2101)

Histogram (2104)

(2102)

(1508) T    $C_q$ (1512)
(1509) Q (1510) → Index 010100100011

(1601)

(2201)

Codebook (2202)

$C_q$
(1512)

N (1506) → Resizing (1507) → T (1508) → (1509) → Q (1510) → Index 010100100011

Conventional encoding/ Basic partitioning

Encoding with multiple assignments

Decoding (2300) (2320) (2322) (2340)

(2310) (2330) (2350)

(2501)　(2502)　(2503)　(2504)

(2901)     (2902)

(3001)     (3002)

(3103)   (3105)

(3104)   (3106)

(3201)   (3202)

METHOD FOR OBJECT RECOGNITION AND/OR VERIFICATION ON PORTABLE DEVICES

PRIORITY CLAIM

The present application is a National Phase entry of PCT Application No. PCT/EP2015/025011, filed Mar. 9, 2015, which claims priority from European Patent Application Number 14160385.2, filed Mar. 17, 2014, the disclosures of which are hereby incorporated by reference herein in their entirety.

FIELD OF THE INVENTION

The present invention concerns a method of providing automatic, fast, robust and secure recognition and/or verification of authenticity of digital—and/or physical objects comprising the steps of codebook training, enrollment, identification, and/or authentication.

BACKGROUND OF THE INVENTION AND STATE OF THE ART

In general, the present invention is situated in the context of physical object security which forms an important issue since quite some time in several domains, such as pharmaceutical and cosmetics products, electronics, luxury watches, text documents and certificates due to the striking numbers and scale of counterfeiting and its spread worldwide. Despite numerous efforts from brand owners and manufacturers, the end-consumers are not well aware, respectively cannot be well aware of the particularities of the original design of a given product or content which is often changed for various commercial and technical reasons and the entire spectrum of security features applied to protect a particular brand. To protect the consumer, for example against taking a counterfeited drug, and to create an essential element of a global anti-counterfeiting network, it would be highly desirable that users can perform a verification by themselves. Furthermore, it would be desirable that information from such verifications could be stored and analysed, amongst other in order to contribute towards accurate and fast information on geographical trends in appearance and distribution in counterfeiting goods as soon as such items enter the market. A similar situation also exists with respect to banknotes that are protected by quite sophisticated security techniques which, however, may not be verified by the average end-consumer, but only by experts.

The problem is complicated by the fact that over the past several years, counterfeiters have gained access to sophisticated technologies that enable them to closely duplicate the brand products. It is a well known fact that counterfeited products can be so accurately duplicated that it even experts might need some special equipment to verify them. However, counterfeited products in most cases bear, as compared to the genuine products, some differences that can be easily recognized by trained experts but that are at the same time difficult or almost impossible to be recognized by casual consumers.

Previous attempts of the security industry to introduce security technologies based on special detectors had little success. This is due to the fact that it is commercially highly unattractive to produce specific hardware devices, which would need to be distributed and regularly upgraded on a global level, simply for verifying individual products. Moreover, although there is a need for fast authentication of consumer goods, end consumers show little interest in using specialized devices for anti-counterfeiting measures, respectively cannot have specific know-how that might be needed to use such specialized devices.

Existing security mechanisms require to modify the technological approach or manufacturing processes of products, do change the look or properties of products, do add extra features or materials, such as holograms, RFIDs, magnetic, rare-earth or luminescent materials, or do require interventions or invasive procedures. Moreover, such protection mechanisms do not always ensure backward compatibility with products already produced in the past.

In general, there currently exist three main methods allowing to realize product verification and, coming along with that, a kind of consumer protection, which, however, use fundamentally different approaches. One method is digital watermarking, also referred to as data hiding, another method is content fingerprinting, also known as robust hashing, and there finally exist methods based on direct visual inspection.

Digital watermarking or data hiding achieves protection by content modification, in particular by embedding a special mark or encoded message which carries information on the protected content. Some of the methods that implement this functionality to physical documents are described in U.S. Pat. No. 7,991,182 for images and in U.S. Pat. No. 7,644,281 for text documents and vector graphics including barcodes as described in US 2010/0012736. The content should be modified such as to ensure reliable and secure extraction of an embedded, desired message. This has three important consequences concerning the necessity (a) to modify the content or object either prior to manufacturing or reproduction or to introduce the marking to already existing objects, see e.g. U.S. Pat. No. 7,965,862, (b) that it is also clonable, if the object design is quite accurately reproduced, and (c) that all objects should be protected by this technology prior to their distribution which is difficult or almost impossible to realize in practice. In fact, watermarking algorithms are designed to be robust to different imperfections in acquisition, especially on mobile devices. Therefore, even if a fake contains some imperfections, the inherent capability of digital watermarks to correct errors will "mask" such imperfections and reduce the ability to detect the fake. Furthermore, direct product marking is also disclosed in U.S. Pat. No. 7,686,231, where a visible marking is added to the product. However, such product modification often is not acceptable to brands and manufacturers because of modifying the product design and look, or complicating the existing manufacturing pipeline. Similar methods are also known to mark text documents by modifying the character shape and size, elements of characters, printing halftone etc., see e.g. U.S. Pat. No. 7,644,281. Being acceptable for new documents, these methods cannot cope with already produced documents. Therefore, such methods do not provide protection for certain types of documents.

Digital content fingerprinting or robust hashing are techniques which extract a fingerprint directly from the object features and no preliminary content pre-processing is performed. As a result, the fingerprints are not very robust in comparison to digital watermarks. This technique is primarily used for digital media such as video and images, see e.g. US 2009/0292701 and U.S. Pat. No. 7,552,120, as well as audio, see e.g. J. Haitsma, T. Kalker, and J. Oostveen, "Robust audio hashing for con-tent identification," in *Proc. of the Content-Based Multimedia Indexing*, Firenze, Italy, September 2001. However, it is also used for physical documents, such as described in in F. Jordan, M. Kutter, C.

di Venuto, Means for using microstructure of materials surface as a unique identifier, WO 2007/028799, and R. P. Cowburn, J. D. R. Buchanan, Authenticity verification by means of optical scattering, WO 2006/120398. The lack of robustness leads to a large amount of errors or mismatches between the original fingerprint and the fingerprint extracted from a distorted counterpart of the original object. In turn, this results in the necessity to perform a highly complex search and identification for trying to match the original fingerprint and the extracted fingerprint. As a result it is difficult to distinguish the errors due to the acquisition imperfections from those caused by content modifications. In recent years, methods were developed which use local features designed in the computer vision for object recognition. This is well suited to classification of objects into several predefined categories that rarely exceed 20'000 classes or searching of semantically similar images. However, the local nature of robust features does not make it possible to detect the small or invisible differences in the object design or appearance. These methods are used for content-based retrieval where only rough or semantic similarity is sufficient to find perceptually close objects. Also, the application of fingerprinting methods for characterising materials that are used for the tracking and tracing of individual items is often not suitable due to (a) complexity of acquisition of a fingerprint from each item, (b) the management of huge databases and (c) searching in these databases that can be in the of order of billions of entries. In most cases, even some special imaging devices are needed to capture the structure of materials, see e.g. R. P. Cowburn, J. D. R. Buchanan, Authenticity verification by means of optical scattering, WO 2006/120398.

The use of fingerprinting techniques is also disclosed in US 2012/10324534 for verification of authenticity of an identity document. The fingerprints are extracted from the text parts and photographic images of the digitized documents using specially designed local and global descriptors adapted to facial images. The text parts are recognized by Optical Character Recognition (OCR) in predefined and aligned regions. These are stored in a centralized database. The global descriptors are computed based on image gradients, whereas the local descriptors are based on a binarized source image. These descriptors are suited for the authentication of identity documents, because the facial images on said documents can be well acquired, standardized according to the templates, and do not exhibit a lot of variability in terms of semantic context. However, this approach meets serious technical constraints if applied to generic object identification, where the reproduced information might be highly variable and non-homogeneous. Furthermore, apart from not being adapted for other types of objects than identity documents having a well defined structure, this framework is not adapted to be used on any kind of device, because many devices suffer from non-linear geometric distortions, which impact the stability of the above mentioned descriptors.

Several documents like US 2011/0158483, US 2010/0329576 disclose a system for printed document authentication and alteration detection based on the well-known bag-of-feature principle, see e.g. also D. G. Lowe, Object recognition from local scale invariant features. In the Proc. of 7$^{th}$ International Conference on Computer Vision, Sep. 20-27, 1999. Segmented parts of a document are considered as individual images containing small elements. A codebook is trained on these small elements, which contain text fragments. Documents to be verified that do not match sufficiently against the enrolled elements in the codebook are considered to be fake. Unfortunately, these block-wise features are not invariant to geometrical distortions, thus necessitating some form of pre-alignment. Such an alignment is possible leveraging the intrinsic geometric structure of the lines of text in a document. However, this approach is obviously not applicable for generic objects that lack strict design elements. Additionally, such type of codebook with block-wise patches can be trained on generic fonts and languages and will not exhibit a lot of variability. In contrast, for authenticating any kind of objects graphic design elements will be more distinctive and consequently also require more memory storage, such that the verification procedure will be more computational intensive. On top of that and similar to the previously described method, depending on the acquisition device used to acquire the entire page document, geometric distortions may be introduced in the acquired image patches burdening the system and hurting performance. Finally, document authentication is assumed to be performed on a document whose identity is perfectly known in advance and which might be established based on added bar codes or any marking which is not feasible in many type of applications.

Security techniques based on visual inspection require either (a) perfect knowledge of the object design particularities or (b) in front presence of a design reference template. At large scale, this is difficult to manage, store and search. Moreover, it is impossible to see small imperfections or deviations by the naked eye. Moreover, the need to store and distribute the elements of design with a high level of details in an open form accessible to humans is not well appreciated by brand owners for various security reasons, since leading to an easier clonability of objects as well as a leak of technological know-how to competitors. Known systems for visual off-line quality inspection require high-resolution stationary imaging systems with accurate alignment of samples and light, see for example the disclosure of WO2013/163978.

In short, the above mentioned existing methods comprise several problems for a variety of reasons which comprise the need to introduce modifications, low discriminative capabilities, high complexity of involved procedures, fundamental restrictions of humans to examine variations at microscopic level or simply the lack of desire of doing so for the ordinary consumers, and the fact that product design elements should be securely protected prior to storage in publicly available services or distribution to consumer devices.

The solutions according to prior art therefore do not entirely satisfy nowadays needs with respect to the protection of generic physical—or digital objects, such that there is still a need for a method for automatic, fast, reliable and secure verification of authenticity of objects to the consumer.

SUMMARY OF THE INVENTION

Thus, it is an object of the present invention to overcome the above mentioned difficulties and disadvantages such as to realize a method for verification of authenticity and/or recognition of digital—and/or physical objects which is fast, robust, accurate and secure, whilst the method does neither introduce any object modifications or add any materials, codes, or electronic chips to the object to be verified nor modify already existing manufacturing processes. Another objective is that the method should protect at least part of the object features, in particular of specific design features which should not be disclosed, whilst safe authentication remaining possible even in this case. As a further objective, the method for verification of authenticity of physical objects should be technologically relatively easy to implement on the manufacturing side as well as, in particular, simple to handle on the consumer side such as to be effectively accepted both by manufacturers and end consumers. It is another object of the present invention to realize corresponding computer program means adapted to implement the proposed method, as well as to use the method for the protection and/or recognition of digital—and/or physical objects.

To this effect, the present invention proposes a method for recognition and/or verification of authenticity of digital—and/or physical objects which is characterized by the features enumerated in claim 1 and which allow to achieve the objectives identified above. In particular, the method according to the present invention distinguishes from prior art methods by the fact that it uses two types of features, of codebooks, and of databases which are specifically designed for identification, respectively authentication, the identification database and authentication database having different organizations.

In particular, the identification database is designed as an inverted file with an identification feature with a given index m containing the corresponding indices of objects possessing this feature, whilst the authentication database is designed as a lookup table storing at index m the authentication features of an object with an attributed index m. Also, the codebook training, object enrollment, and object verification steps of the method are specifically organized such as to use in particularly advantageous way the different types of features which serve different purposes. Accordingly, the types of features are treated in different manner. For example the identification features may be encoded by multiple assignment, i.e. in overlapping regions at the separation boundaries between neighboring feature centroids features belonging to these overlapping regions are and attributed to all of the corresponding centroids. A reliability function may be used as a weight for these features. Furthermore, alignment may be applied in different ways, and feature encoding may be crypted in order to secure the object design against counterfeiting.

Other features together with technical details, theoretical derivations and experimental data supporting the proposed method as well as the corresponding advantages of the present invention are mentioned in the dependent claims as well as in the description disclosing in the following, with reference to the figures, the invention in more detail.

BRIEF DESCRIPTION OF THE FIGURES

The attached figures exemplarily and schematically illustrate the principles as well as several embodiments of the present invention.

FIG. 9 shows an example for the global alignment step of FIG. 6 based on the ACF for printed documents.

FIG. 10 shows the document of FIG. 9 in a rotated position and its corresponding ACF.

DETAILED DESCRIPTION

In the following, the invention shall be described in detail with reference to the above mentioned figures.

Figure 1:
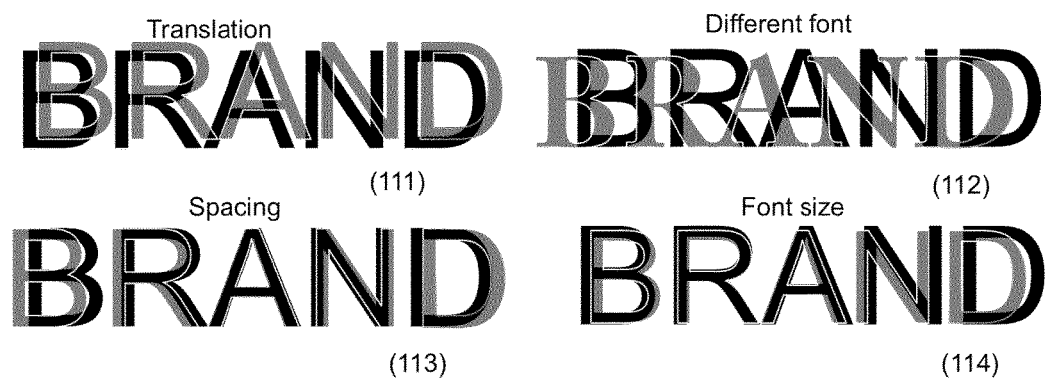
FIG. 1 schematically shows typical counterfeiting of printed logos and text with differences in the text position, text font, letter spacing, and font size.

The present invention, in general, is situated in the context of techniques that are used for protection of digital—and/or physical objects against counterfeiting. FIG. 1 exemplifies typical counterfeiting of printed logos and text with differences in the text position, e.g. translation 111 of the text, in the text font 112, in the letter spacing 113, and in the font size 114. Other examples might include the differences in color, type of halftone patterns and printing technologies, or different placement of halftone patterns. According to the present invention, protection of digital—and/or physical objects is achieved by automatic verification of the objects by use of mobile phones or other imaging equipment adapted to be used by end consumers.

The proposed method for object verification is based on the verification of the correspondence between a probe under investigation and a reference design enrolled by an authorized party. If the correspondence is within pre-established margins, the object is declared as an object that resembles the original design within the corresponding confidence level and it is assumed to be authentic. Otherwise, its authenticity is denied. Such verification is performed based on mobile phone imaging and automatically, without intervention of humans, which makes the method fast, reliable, flexible and applicable to large-scale applications.

The verification process being intuitively simple represents at the same time a number of technological challenges related to the fact that the verification shall be executed by use of mobile phones. Such verification has to deal with very strong non-linear and geometrical distortions, high variability of imaging conditions leading to image blurring and defocusing, and compression artifacts explicitly present in most mobile imaging architectures. In addition, the number of objects that should be verified might be very large and reach millions. This leads to the necessity to store and match all their particular and distinguishable features which induces complexity and memory storage issues. The number of features per item might be very large and, with all necessary representations and indexing, might exceed the size of a given original image. In addition, these features should be stored and distributed securely to avoid any leakages leading to successful bypassing of the verification mechanisms. Not less important is the backward compatibility when the proposed protection should be applied to already manufactured objects or objects in circulation. Moreover, no distortions or modifications to new objects are allowed in many applications as well as no optical, electronic or printed elements can be added to the object to be protected besides those elements that are already present.

To resolve all these challenging requirements, the method of verification according to the present invention is applied to any existing object without any need to introduce any additional modifications or interventions to both the object and its manufacturing process. The verification features can be acquired and enrolled at any time in the product/object life circle and by any authorized party. The identification of objects by their features is very efficient and often represents only a small fraction of a given original image size. The identification is also very fast and can be applied to hundreds of millions of objects in a very short time. In addition, the way in which the verification features are stored assures their secure distribution and even allows outsourcing of such verification services to third parties or cloud-based services.

Several embodiments of a method of recognition and/or verification of authenticity of digital—and/or physical objects according to the present invention will be described in the following in detailed manner by referring to the accompanying drawings.

In general, a method of recognition and/or verification of authenticity of digital—and/or physical objects according to the present invention comprises several steps, in particular the steps of codebook training, object enrollment, and object verification which may consist in object recognition and/or authentication. Each of these steps comprises several sub-steps which may be realized in different manner and will be described here below.

1. Codebook Training

Given a set of training images acquired from real objects to be protected, respectively to be authenticated by the proposed method, or corresponding training images provided in electronic form, a first method step called codebook training is accomplished. The goal of codebook training is to find the most compact and representative group of features that can be used for the unique, robust and reliable identification and authentication of a given object.

Figure 2:
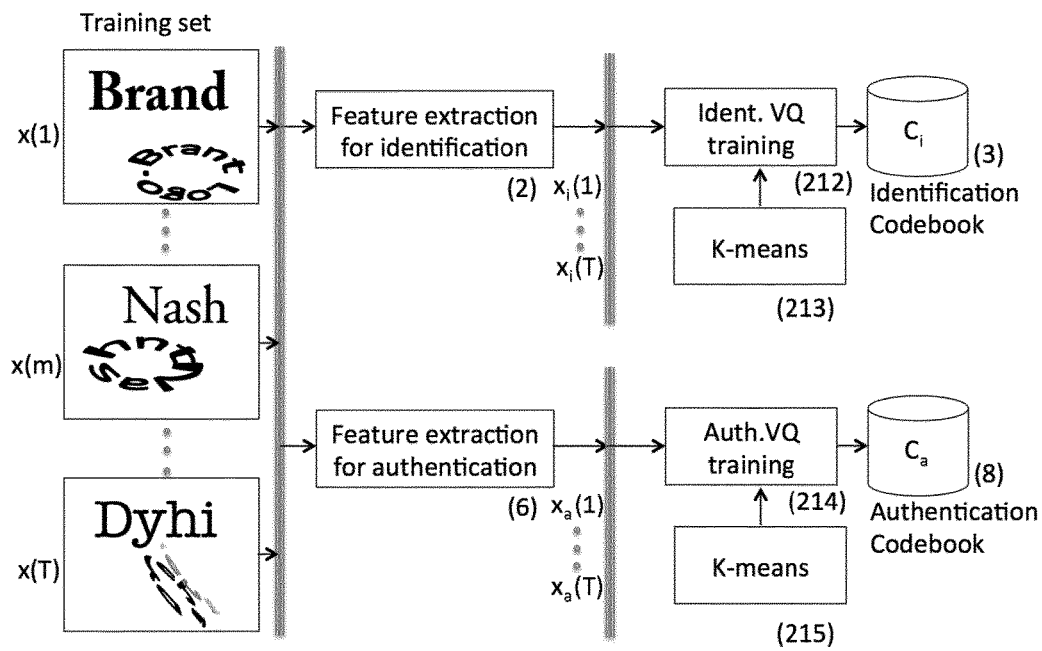
FIG. 2 schematically illustrates the codebook training step of a method according to the present invention.

The codebook training is schematically shown in FIG. 2 and consists of two parts that have essentially the same structure, i.e. codebook training for identification and codebook training for authentication. At the first stage two groups of identification and authentication features are extracted from a set of training images in steps (2) and (6) of FIG. 2, respectively. These features are then each clustered in a pre-defined number of clusters in steps (212) and (214), respectively. The number of clusters is chosen to find a reasonable trade-off between approximation accuracy, complexity, and memory. For this reason, the vectors of features are splitted into J disjoint blocks and k-means algorithms produce K centroids in each block. These centroids are registered in corresponding codebooks. Although codebook training is a standard element of many machine learning and computer vision algorithms, it is important to note that the method according to the present invention comprises two types of codebooks which are used for identification, respectively authentication. These codebooks can be considered as different levels of granularity where the features used for identification tolerate relatively severe variations in feature mismatching while the authentication features and codebook are designed in such a way to sense even minor deviations in the image under investigation with respect to a pre-defined template as shown in FIG. 1. That is why most of features designed in state-of-the-art vision and pattern recognition systems such as SIFT, SURF, ORB, GLOH, etc., are not suitable for the proposed method and it is a subject of the present invention to present a new set of features and also a new way of their encoding.

In detail, given a training set of images $x(1), \ldots, x(T)$ consisting of T training images (210), the proposed method extracts for each image, in step (2) of FIG. 2, the features $x_i, \ldots, x_i(T)$ that will be used, in step (3) of FIG. 2, for identification codebook $C_i$ training and, in step (6) of FIG.

2, the features $x_a(1), \ldots, x_a(T)$ that will be used, in step (7) of FIG. 2, for authentication codebook $C_a$ training. The corresponding vector quantizers (212) and (214) are trained based on k-means clustering algorithms (213) and (215) applied to the identification and authentication features extracted from said T trained images, accordingly. The training images might come from design files provided by the authorized parties or be acquired directly from a set of training objects. The identification codebook $C_i$ also contains information about the feature points in which the identification features are computed, such as will become clear in the further course of the description.

2. Object Enrollment

Figure 3:
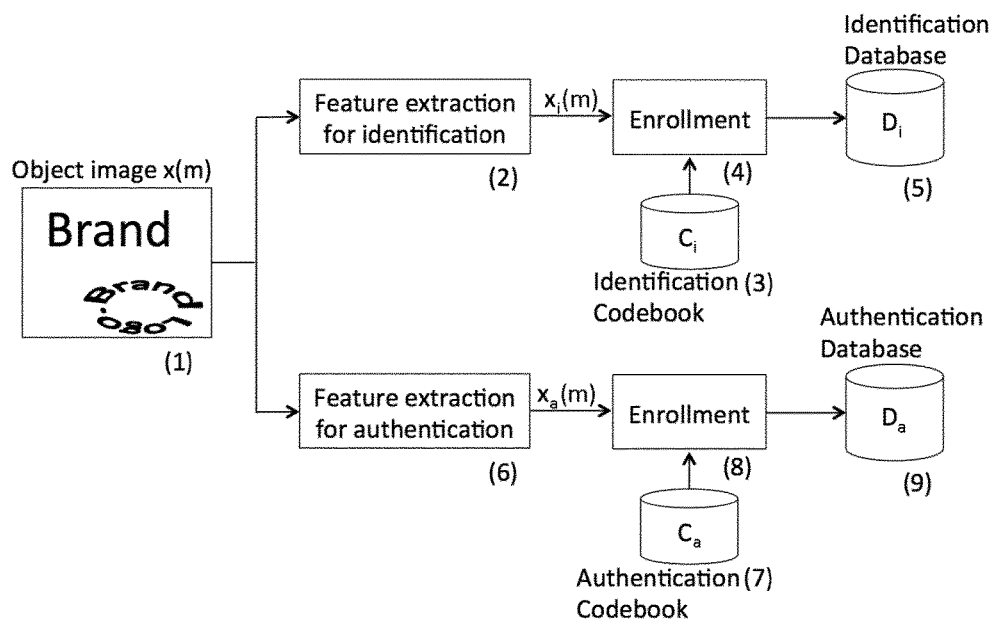
FIG. 3 schematically illustrates the enrollment step for a given digital—or physical object.

The object enrollment is based on the codebook training steps (3) and (7) illustrated in FIG. 2, respectively on the corresponding trained identification codebook $C_i$ and authentication codebook $C_a$. FIG. 3 schematically illustrates the enrollment step for a given object with index m. An image x(m) of the given object might come from design files provided by an authorized party or be acquired directly from the physical object to be protected. Given the object image x(m) as shown in step (1) of FIG. 3, where the object index m defines its type and all metadata in the dataset, the acquired object image x(m) is decomposed such as to extract identification features $x_i(m)$ and authentication features $x_a(m)$ in steps (2), respectively (6) of FIG. 3. The identification features $x_i(m)$ are enrolled into and stored in the database $D_i$ in steps (4) and (5) of FIG. 3 using identification codebook $C_i$ previously trained in codebook training step (3). The authentication features $x_a(m)$ are enrolled into and stored in database $D_a$ (9) in steps (8) and (9) using authentication codebook $C_a$ previously trained in codebook training step (7). It is important to remark that the databases $D_i$ and $D_a$ have different organizations. The identification database $D_i$ is designed as an inverted file, i.e. an identification feature $x_i(m)$ with a given index m contains the corresponding indices of objects possessing this feature. The authentication database $D_a$ is designed as a lookup table, which stores the authentication features $x_a(m)$ under the index m.

3. Verification

Figure 4:
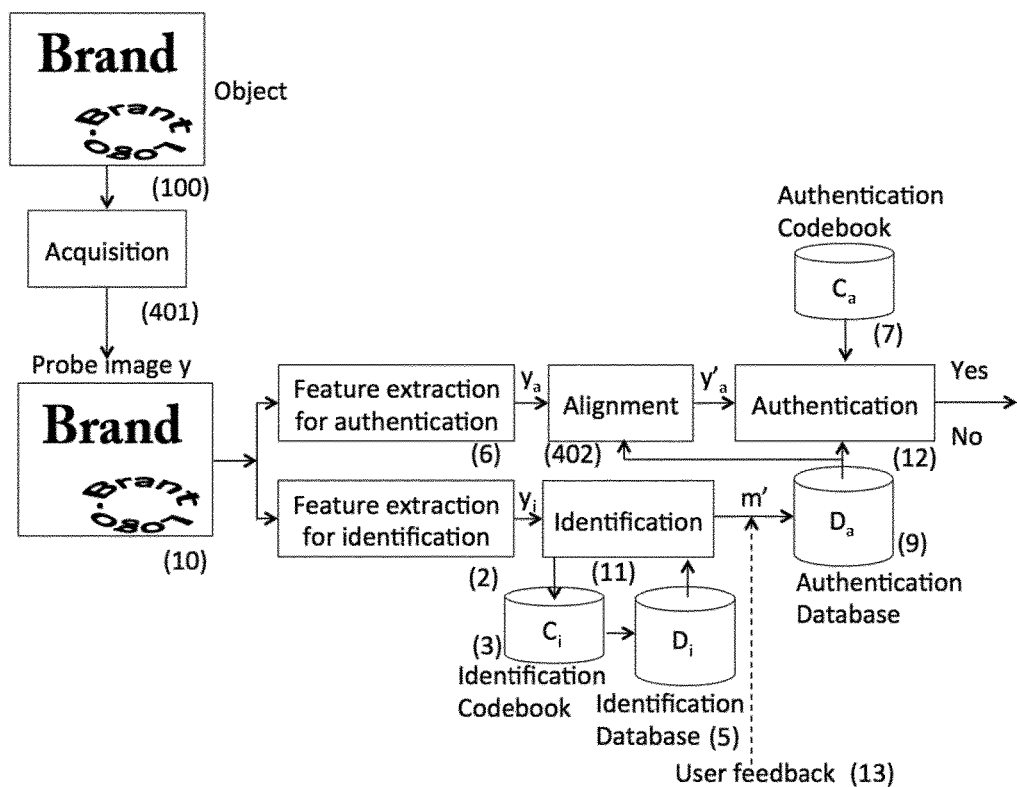
FIG. 4 is a generalized block diagram showing digital—and/or physical object verification based on sequential object type identification, high-precision synchronization and authentication according to the present invention.

The object verification consists of three main steps such as shown in FIG. 4. The latter illustrates the overall idea of the proposed method and shows the further steps and elements of object verification. An image y of the object (100) under verification is acquired in step (10) by use of an acquisition device (401), preferable by a mobile acquisition device such as a mobile telephone equipped with a camera or any other imaging equipment adapted for use by an end consumer. The feature extraction steps (2) and (6) of FIG. 3 are then applied analoguously to the acquired image y, by decomposing said image y into identification features $y_i$ and authentication features $y_a$. Then, in a first main object verification step, the type of object y is identified in step (11) by producing an estimate of the object index m' referring to the identification database of enrolled identification features stored in the identification database $D_i$. This is achieved by matching the identification features $y_i$ extracted from the acquired image y with those stored in the identification codebook $C_i$. The matched features are forwarded to the inverted file identification database $D_i$, which identifies the most likely candidate indices of objects known in the identification database $D_i$ which could correspond to the object under verification. Then, the identification step (11) makes a final decision about the type of object probably represented by the object under verification and forwards its index m' to the authentication database $D_a$. If the object under investigation cannot be identified uniquely in identification step (11), several estimates are produced and revealed to the user, such that the latter may select an appropriate one by direct interaction with the system by providing a user feedback in step (13) of FIG. 4. Otherwise, the method chases the most likely candidate and forwards the final estimate m' to the authentication database $D_a$. The produced estimate corresponds to the image in the identification database $D_i$ which is closest to the acquired image y. However, this stage does not guarantee identification of the object under inspection on microscopic level. Therefore, once the type of object is recognized, final verification is based on validation of authenticity at an authentication stage. To that effect, the authentication database $D_a$ containing the templates of enrolled authentication features $x_a(m')$ of authentic objects retrieves information necessary for reliable authentication. The authentication database $D_a$ obtains the enrolled authentication features $x_a(m')$ of the final estimate m' having been forwarded. In case of several forwarded candidates, all corresponding templates are extracted from the database $D_a$ for the final verification. Then, the authentication features $y_a(m')$ extracted from the acquired image y in step (6) are aligned, in a second main object verification step, with the template authentication features $x_a(m')$ obtained from the authentication database $D_a$ in alignment step (402) of FIG. 4, resulting in aligned authentication features $y'_a(m')$. Then, the final decision on authenticity of the object under investigation is performed in a third main object verification step, authentication step (12) of FIG. 4, by comparing the aligned features $y'_a(m')$ with the template authentication features $x_a(m')$ obtained from the authentication database $D_a$. The method determines the level of correspondence between the aligned features $y'_a(m')$ and features $x_a(m')$ and produces an overall decision with respect to authenticity of the object under verification and/or displays the differences by highlighting the major differences between the compared features.

3.1. Object Identification

Unique object identification can be based on barcodes that contain the encoded type of object. However, barcodes usually are not printed at the same side of a packaging than the main informative or commercial design. To the contrary, barcodes are often printed on the backside or bottom of packaging such as to facilitate fast reading and to avoid interference with the commercial design. Therefore, if barcodes are used for identification, then a two stage acquisition is needed from the frontal side that requires a corresponding two-stage imaging. In some applications, this is acceptable. However, this is not user-friendly and might take too much time. Moreover, many documents might not contain barcodes. For these reasons as well as to facilitate the interaction protocol, the method according to the present invention uses a one-stage verification which identifies and authenticates the object from the same design, i.e. by using only a single image.

Figure 5:
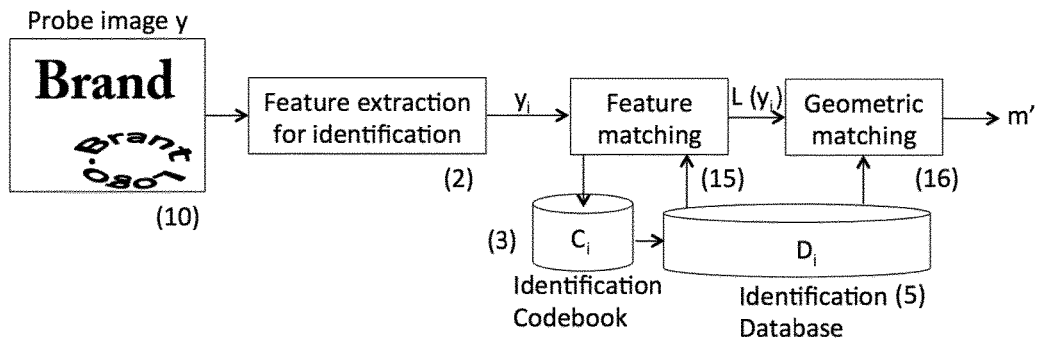
FIG. 5 is a block diagram showing in more detail identification step according to FIG. 4.

The structure of the object identification step (11) of FIG. 4 is shown in schematic manner in FIG. 5. It consists of three main stages which are feature extraction (2), feature matching (15), and geometric matching (16). The feature extraction step (2) for identification extracts a set of identification features $y_i$ from the probe image y. The implementation of the feature extraction is explained in more detail here below with reference to FIG. 6. The extracted identification features $y_i$ are matched with the identification database $D_i$ in step (15) of FIG. 5 via the identification codebook $C_i$ resulting into a list of possible closest candidates $L(y_i)$ possessing similar identification features. To this effect, each feature from a set of features $y_i$ is tested versus the codebook $C_i$ (3) to produce the indices of features corresponding to $y_i$. Then, the obtained indices of features are passed to the identification database $D_i$, which is organized as an inverted file. The database $D_i$ returns the corresponding indices of objects containing the above mentioned indices of features. This operation works like a look up table and is very fast. For ease of explanation at this place, the fast and robust implementation of feature matching will be explained in more detail in the further course of the description with referral to FIG. 23. The third and final main step of identification cross-checks the spatial appearance of feature indices in a geometric matching step (16), in correspondence to the spatial appearance of the retrieved list of object candidates $L(y_i)$. The candidate with the best match is identified as the index m'. If such a candidate cannot be uniquely identified and several candidates have the same level of similarity, then all these candidates are chosen. Otherwise, if none of the candidates from the list $L(y_i)$ fulfils a pre-defined limit of similarity, the object is declared as not recognized, which is considered either as an indicator that the object under inspection is probably a fake or that it is a new object that is not yet in the database of authentic objects. In both cases, the verification procedure is terminated and the user is properly informed about this result.

Figure 6:
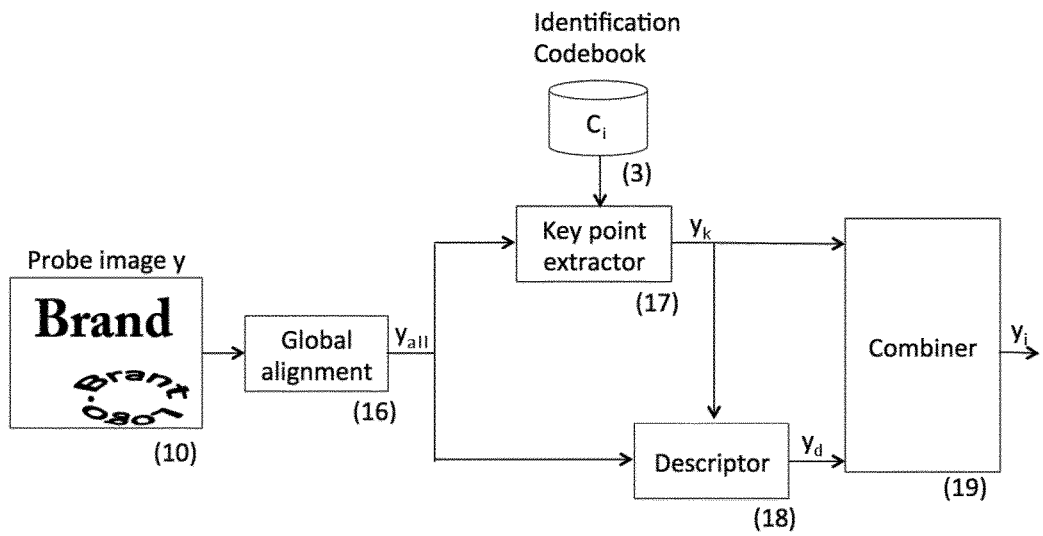
FIG. 6 is a block-diagram showing in more detail the feature extraction step for identification and illustrates in exemplary and schematic manner a possible implementation of step (2) of FIGS. 4 and 5.

The feature extraction step (2) for identification such as illustrated in schematic manner in FIG. 6 forms a possible implementation of step (2) of FIGS. 4 and 5. It consists of the steps of global alignment (16), key points extracting (17), and computation of descriptors (18).

The goal of global alignment consists in transformation of the acquired probe image y to the reference coordinate system that might include some fixed orientation, scale, etc. The alignment can be based on generic structured properties of logo, dither patterns or text symbols and assumption about the shape of verified object such as for example corners of package. This results into the aligned image $y_{all}$. The global alignment consists in the estimation of a global rotation angle based on the periodical properties of letters and/or halftone patterns leading to the appearance of clear peaks in the ACF. The misplacement of peaks with respect to the chosen reference coordinates indicates the rotation angle. The scaling can be estimated in the same way. Moreover, the global alignment can be implemented during the acquisition process when the shape of the object is roughly matched with some adjustment frame displayed on the screen of the imaging device used for image acquisition. In general, such a rough alignment might be sufficient for reliable key point detection and descriptor computation. The global alignment step (16) might not be necessary in all cases, thus is optional. If this step is not performed, the image y is directly passed to the key point extraction step (17).

Figure 7:
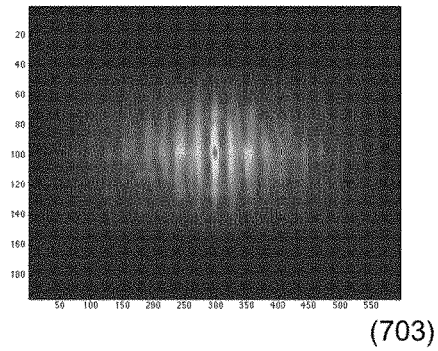
FIG. 7 shows an example for the global alignment step of FIG. 6 based on an autocorrelation function (ACF) of a brand logo "BRAND".
Figure 7:
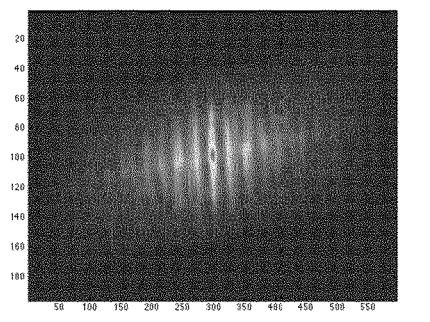
Figure 8:
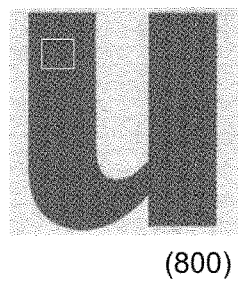
FIG. 8 shows an example for the global alignment step of FIG. 6 based on the ACF of dither patterns.
Figure 8:
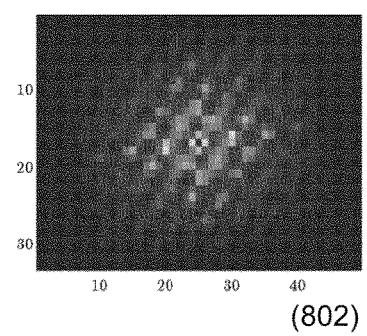
Figure 8:
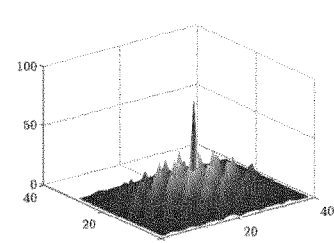
Figure 8:
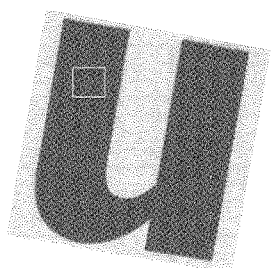
Figure 8:
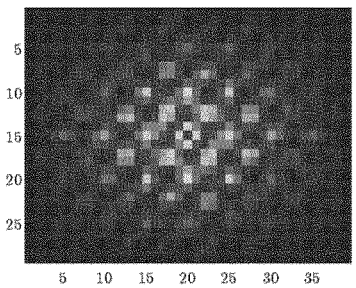
Figure 8:
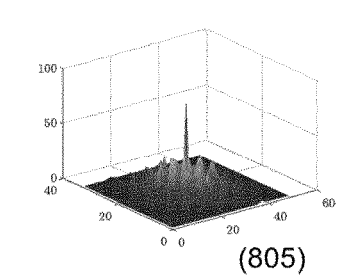
Figures 9, 10:
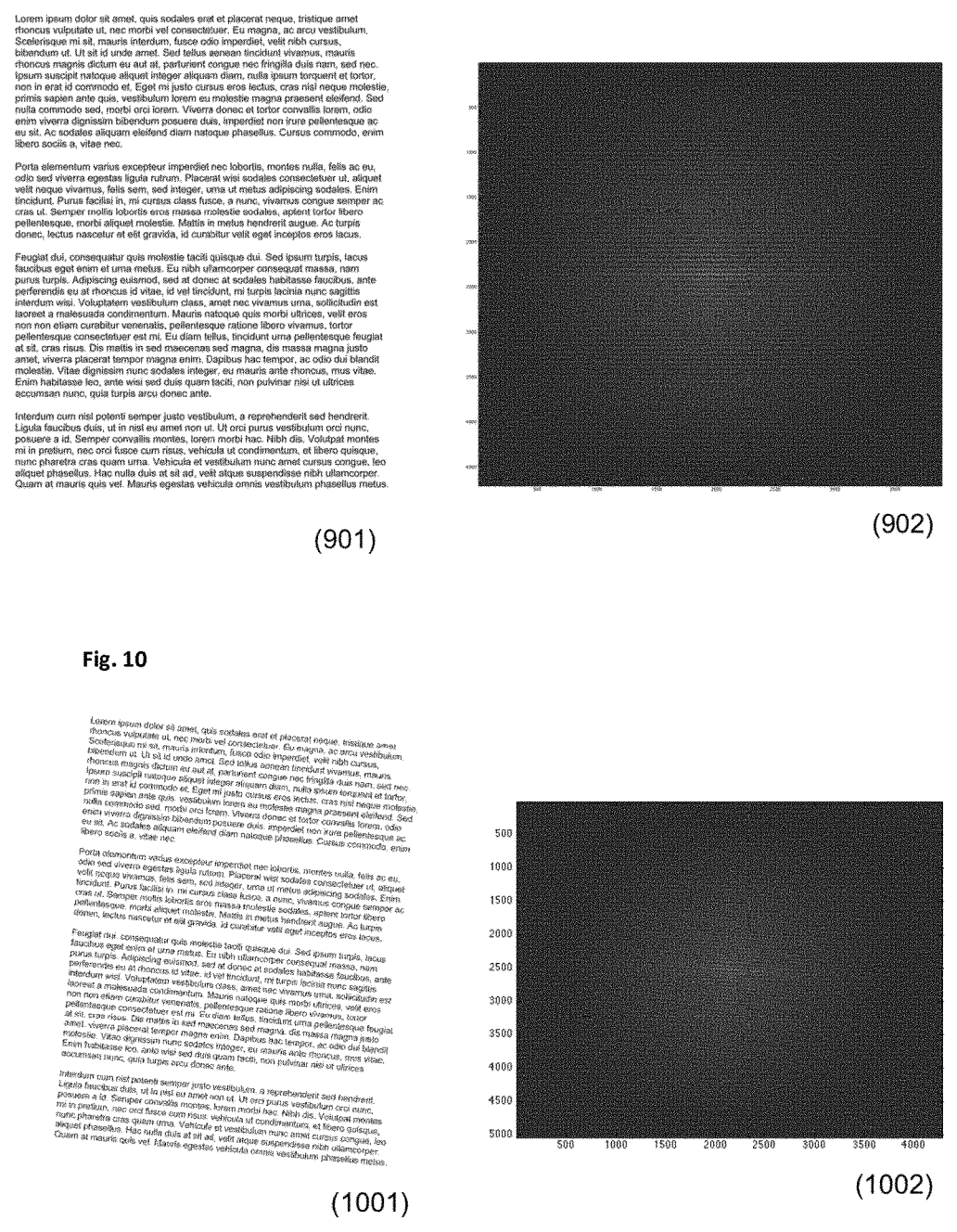

Examples of global alignment based on an autocorrelation function (ACF) are shown in FIGS. 7, 8, and 9, 10 for a brand text logo, a halftone pattern and a multi-line text document, respectively. FIG. 7 illustrates the global alignment step (16) of FIG. 6 by use of an example based on an autocorrelation function (ACF) for a brand logo "BRAND", the latter being shown in the original (701) and rotated (702) positions together with the corresponding ACFs (703) and (704). Clear peaks indicate the orientation of the logo that can be used for fine horizontal alignment. It can be also used for the scale normalization. A very precise estimation of the ACF parameters is obtained by preliminary computation of absolute values of gradients of the input images. The computation of the ACF, known in principle in prior art and thus not requiring further explanation at this place, is very efficient using the Fast Fourier Transform (FFT). FIG. 8 illustrates the global alignment step (16) of FIG. 6 by use of an example based on the ACF of dither patterns. The dither pattern (800) for printed text or images has a periodical structure for different color components. The letter "U" was printed using ordered halftoning. A region within a small white rectangle within the letter "U" was used to compute an ACF that is shown in two-dimensional (802) and three-dimensional plots (804). The rotation of the letter "U" (801) is reflected in the modification of the corresponding ACF taken within the same region of said "U" as shown in two-dimensional (803) and three-dimensional plots (805) of FIG. 8. FIG. 9 illustrates the global alignment step (16) of FIG. 6 by use of an example based on the ACF for printed documents that consist of multiple lines of text characters. The lines of text represent a periodical structure (901) that is reflected in the periodicity of the corresponding ACF (902). FIG. 10 shows the document of FIG. 9 in a rotated position (1001) and its corresponding ACF (1002). The parallel lines are rotated at a corresponding angle. Such a rotation can be accurately automatically estimated such that the document can be aligned.

The key point extraction step (17) extracts a set of pre-defined characteristic points in the image y. The pre-defined points are defined as a predefined set of features in the codebook $C_i$ (3) and might include edges, lines or special shapes of text, graphics or image patches. Alternatively, the key points are computed periodically over the image y with a defined periodicity and structure of a corresponding sampling grid. The key point extraction (17) results into a set of key points $y_k$ that are characterized by a position and their indices according to the codebook $C_i$. The coordinates of key points $y_k$ are indexed and passed to the descriptor computation (18).

The descriptor computation step (18) might be applied to each individual key point $y_k$ or to a group of key points with a pre-defined configuration. Step (18) computes the descriptors $y_d$ in the positions defined by the previously determined set of key points $y_k$ in the aligned image $y_{all}$. The descriptors characterize shape, color, type of dithering, as well as distances between the key points and comprise semantic information related to attribution of the descriptors to specific semantic groups, e.g. to the same character shape or graphic design element, as well as encoded information characterizing the design elements between two key points with pre-defined properties. Finally, in a combination step (19), the key points and their descriptors are combined into a compact form that corresponds to the identification features $y_i$.

Figure 11:
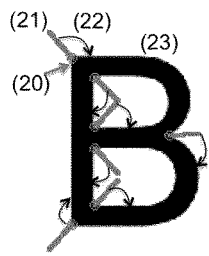
FIG. 11 schematically and exemplarily illustrates a first embodiment of descriptor computation according to step (18) of FIG. 6 for some element of brand text "B".
Figure 12:
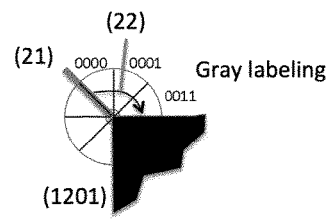
FIG. 12 illustrates the design principle of a descriptor computed according to the first embodiment of descriptor computation shown in FIG. 11.
Figure 13:
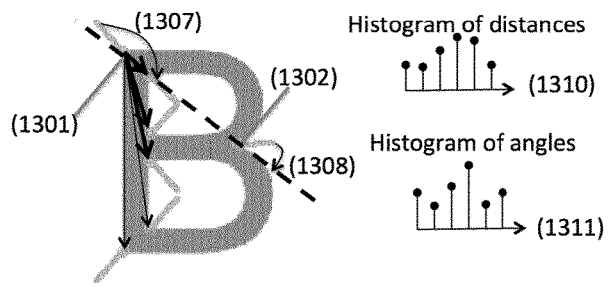
FIG. 13 schematically and exemplarily illustrates several possibilities of semantic descriptor design composed of multiple descriptors contained within the same semantic group defined by the shape of letter "B".

Examples of the descriptor computation according to step (18) of FIG. 6 are shown in FIGS. 11 to 13. In a first embodiment shown in FIG. 11, the descriptor (21) characterizes the local statistics of a given key point (20) which in this example is defined as a corner with predefined properties. The descriptor (21) is characterized by an angle (22) between the gradient at the key point (20) with respect to two edges forming the corner shape defining the key point (20) and the nearest design element (23) in clock-wise order such as shown in FIG. 11. The descriptor (21) is designed such as to be always symmetrical to the shapes left-wise and right-wise. All descriptors computed within the same "semantic" element of the segmented letter "B", i.e. within the shape of letter "B", are combined together. To provide compact and robust representation, the angle (22) is represented in quantized way using a discrete grid of segments, such as illustrated schematically in FIG. 12, and encoded using Gray code, thus producing a binary index representing the determined angle (22). Each segment is assigned a binary index and the binary indices of all segments are generated in a form of the Gray code to produce a robust encoding of gradient orientation. The binary indices of all segments are generated in a form of the Gray code to produce a robust encoding of gradient orientation. If the designed element (1201) is acquired under some projective transformation resulting in a transformed element (1202), the angle (22) between the gradient (20) at the key point (20) and the design element (23) might change which will might result into another index after quantization. Gray encoding ensures robust extraction of the binary segment index corresponding to the angle (22) with a minimum Hamming distance between neighboring segments.

In another embodiment shown in FIG. 13, the descriptors might include multiple key points description by quantizing (1) the distances between all key points (1301)-(1306), computed and stored in quantized manner similar to the angle encoding based on Gray labeling, or their ratios, (2) the features extracted along a virtual connecting line between these key points, like the connecting line between the key points (1301) and (1302) crossing the elements of letter "B" exemplarily indicated in FIG. 13, such as the proportion between the black and white regions or between the positions of crossing points, (3) the proportion between the angles (1307) and (1308) formed between the gradients and said connecting line between given key points, such as illustrated in FIG. 13, (4) the proportion of all angles and distances between all local descriptors, and finally (5) a function g(.) computed in the point of cross-section and design element that might for example consist in a local gradient. All these data can be efficiently represented by histograms like depicted as (1310) and (1311) in FIG. 13. In another embodiment not illustrated in the figures, special rules can be chosen to determine the order of description such as to reduce the complexity and memory used by the descriptors. For example, the vertical line of letter shape "B" and the line connecting the key points (1301) and (1303) indicated in FIG. 13 can be chosen as a reference system. The largest non-ambiguous distance between two key points can be used as reference. The key points with a certain ratio of distances, angles and cross-sections can also be chosen as reference systems. Finally, specific colors can serve for the same goal.

Figure 14:
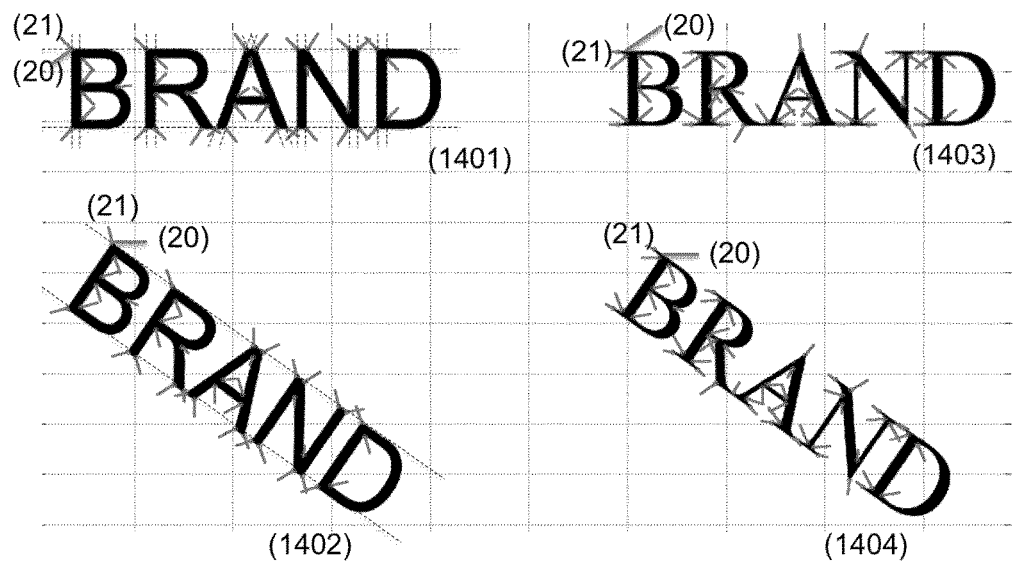
FIG. 14 illustrates the robustness of the extracted identification features to rotation.
Figure 15:
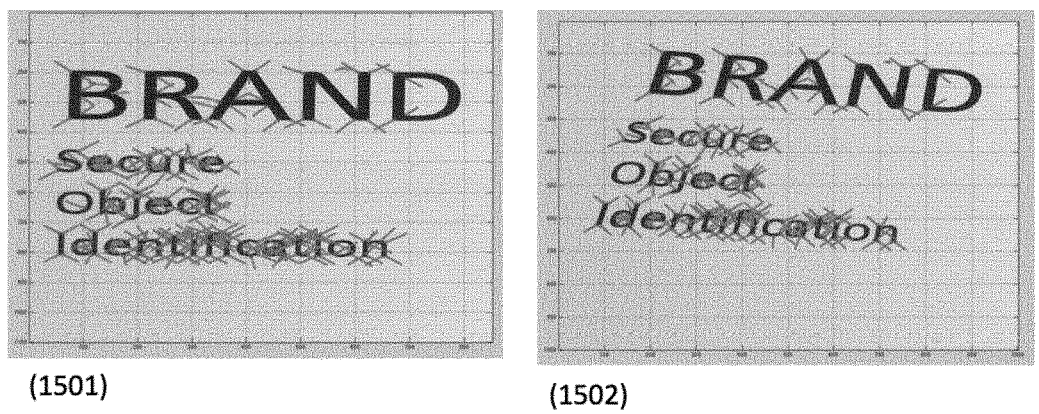
FIG. 15 demonstrates the robustness of the extracted identification features to real mobile phone imaging suffering under projective transformation.

FIGS. 14 and 15 illustrate the robustness of the identification features extracted in the above described manner to rotation and mobile phone imaging with projective transformation, respectively. In FIG. 14, upper line, the word "BRAND" is reproduced in two different fonts (1401) and (1403) and the above described descriptors are computed for each font. The resulting descriptors demonstrate a high distinguishability between the word "BRAND" reproduced by two different fonts. In FIG. 14, lower line, the descriptors produced by the method according to the present invention for rotated counterparts (1402) and (1404) of the word "BRAND" (1401) and (1403), again reproduced in two different fonts, posses a remarkable similarity with the descriptors produced for the non-rotated words "BRAND" (1401) and (1403), which demonstrates the high robustness of the method. In FIG. 15, the left image (1501) corresponds to an original image and the right image (1502) shows a corresponding image such as acquired by a mobile phone under projective transformation, the descriptors produced by the method according to the present invention being in both cases indicated schematically and exemplarily. A comparison shows that about 10% of descriptors have disappeared or appeared in false positions whereas 90% of descriptors are correctly extracted which again demonstrates a remarkable performance of the method. As shown by these examples, the proposed identification features demonstrate a very stable performance.

Figure 16:
FIG. 16 schematically illustrates a semantic hierarchical feature organization.

In another embodiment, the identification features can be organized into a specific semantic hierarchical feature structure such as schematically shown in FIG. 16. In this case, all design elements have some distinctive connected features which are grouped at several hierarchical levels (1901)-(1903) by sequentially combining the features from individual elements. First, the features are semantically extracted from each design element. Then, features extracted from nearby neighbors are combining at a first hierarchical level (1901), afterwards neighboring combined features of the first hierarchical level (1901) are grouped at a second hierarchical level (1902), until finally all elements together are combined at a last hierarchical level (1903), the number of levels depending on the manner of combination and the number of features to be combined. The order of semantic elements is also recorded. The corresponding identification codebooks $C_{i1}, C_{i2}, \ldots, C_{iL}$ are trained and the resulting encoded identification features are stored in the database $D_i$ containing the indices of trained features and corresponding object identifiers.

Figure 17:
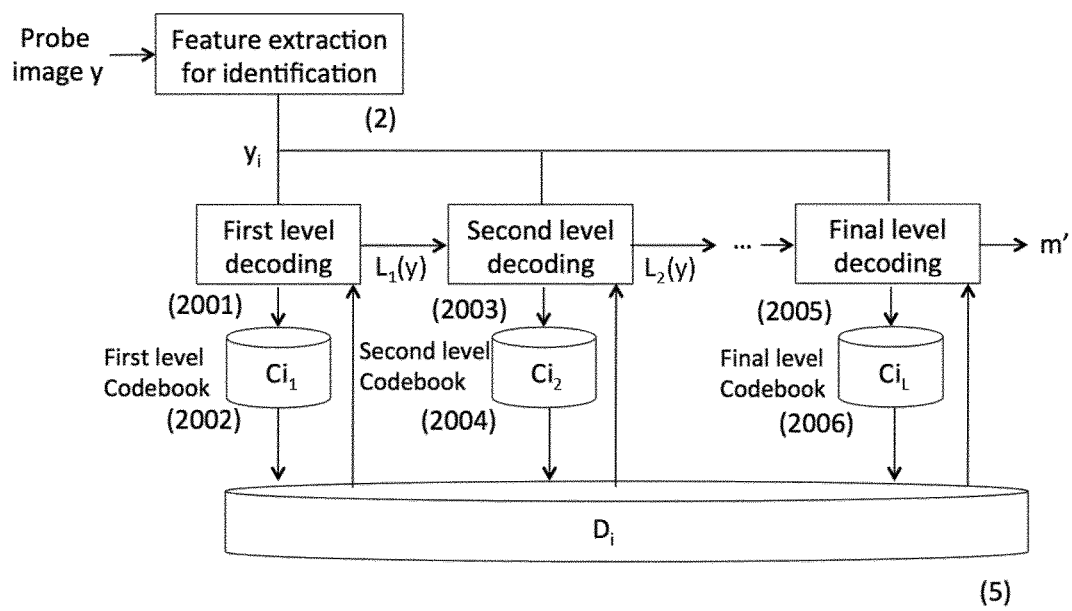
FIG. 17 schematically illustrates an embodiment of feature matching adapted for the identification step (2) of FIGS. 4 and 5 based on hierarchical semantic organization of FIG. 16.

The decoding or search in such a hierarchical structure is schematically illustrated in FIG. 17, this type of feature matching being adapted for the identification step (2) of FIGS. 4 and 5 in case the identification features were based on hierarchical semantic organization according to FIG. 16. The features are extracted from the probe image y in step (2), thus resulting into a feature vector $y_i$. A first level decoder (2001) produces a list of possible candidates $L_1(y)$ that match best (2002) at the first level representation according to the codebook $C_{i1}$. The corresponding indices of objects are retrieved from the database $D_i$ in step (5). The second level decoder (2003) searches in a further step the restricted space defined by the list of candidates $L_1(y)$ and produces, according (2004) to the codebook $C_{i2}$, a smaller list $L_2(y)$ that is analoguously passed to the next decoder. Finally, the last decoder (2005) produces, according (2006) to the codebook $C_{iL}$, the final estimate of the most likely index m' of the object enrolled in database $D_i$ which probably corresponds to the object under verification. Such an organization significantly reduces the search complexity and increases the identification accuracy by removing a lot of false matches at each level.

Figure 18:
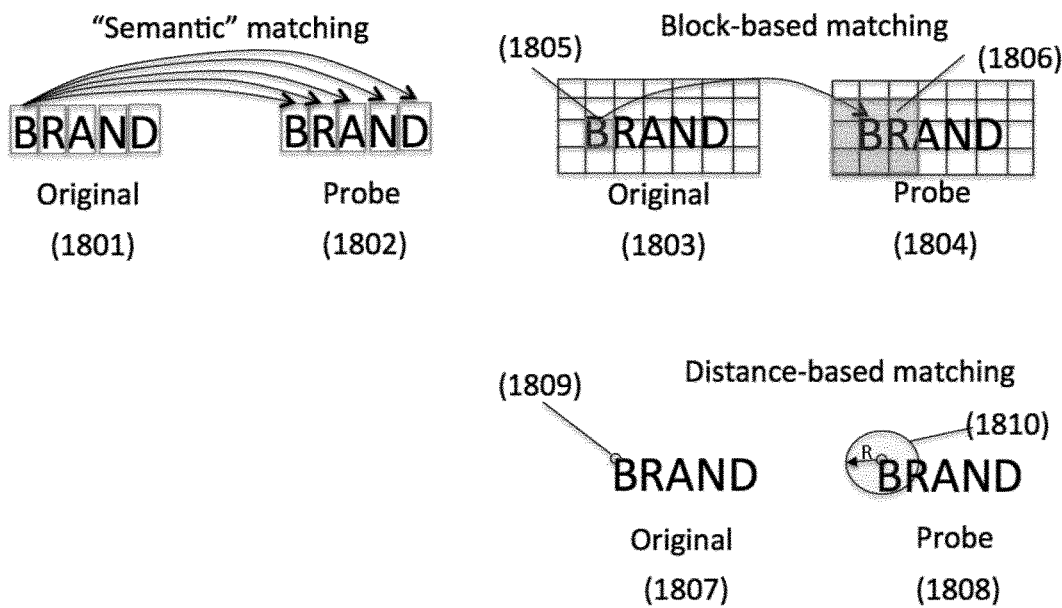
FIG. 18 schematically illustrates further embodiments implementing different semantic hierarchical feature organizations based on geometric proximity of features used for the design, in particular based on semantic, block-based and distance-based measures.

Further embodiments implementing different semantic hierarchical feature organizations are schematically illustrated in FIG. 18. These embodiments include the geometric proximity of features used for the design and are based on semantic, block-based and distance-based measures. Semantic grouping of features is based on the clustering or segmentation of certain elements of object design or images possessing the same characteristics. Each element of an original image (1801) and a corresponding probe image (1802) is segmented. Instead of exhaustive matching of all descriptors within each semantic group with all descriptors in the probe image, only the descriptors within one semantic group are matched with the descriptors of another semantic group. This drastically increases the accuracy of matching thus reducing the number of false matches and also decreases the complexity of matching. Block-based and distance-based grouping of features are definitions of geometric proximity that assume a rough pre-alignment of the images to be matched. In the block-based definition of geometric proximity, a partitioning of the image into a set of blocks such as depicted by (1803) and (1804) in FIG. 18 is performed. If some feature is detected in a given block (1805) of the assumed original image (1803), the likely matching features are searched only in the nearest neighboring blocks (1806) around the block of the probe image (1804) corresponding to said given block (1805) of the assumed original image. It is obvious that, if the images are roughly pre-aligned, it is very likely that the features in nearest blocks of one image will be in the nearest corresponding blocks of the other image. In the distance-based definition of geometric proximity illustrated in FIG. 18, the search space of possible matching features is defined by a circle (1810) of radius R in the probe image (1808) around the detected feature (1809) of the assumed original image (1807). In addition, the image elements can be semantically segmented, like all pixels belonging to the same shape or letter according to predefined rules, and the geometrical features of each region such as a center of mass can be taken as a representative feature of each element. The line that connects these features can be considered as a cross-section.

Figure 19:
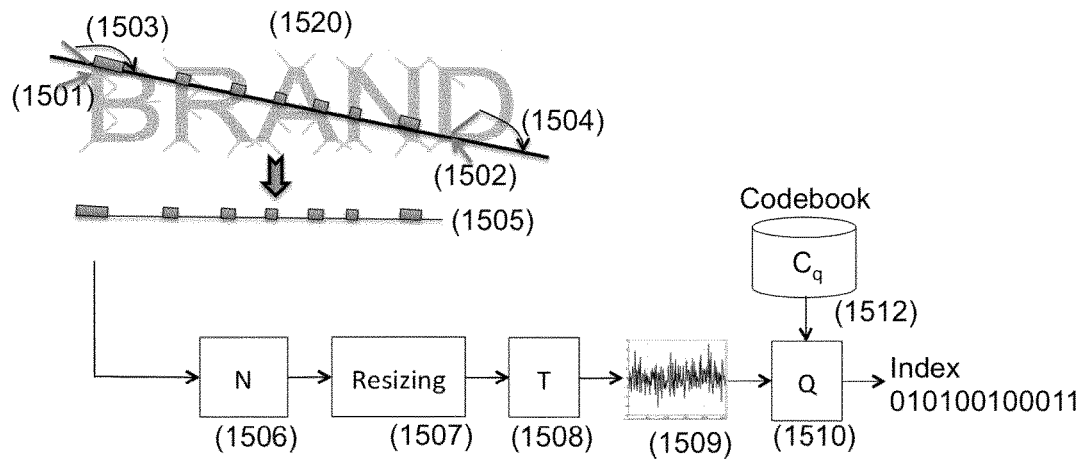
FIG. 19 schematically illustrates optional encoding of cross-section features of FIG. 13.

The features extracted from multiple local descriptors such as cross-sections can be additionally efficiently encoded, a corresponding embodiment being schematically and exemplarily illustrated in FIG. 19 based on the example of the encoding of cross-section features such as explained in the context of FIG. 13. The key points in the image, in this example the design element "BRAND", are detected and their descriptors are computed. The key points with special properties of descriptors or their relationship as discussed in the context of FIG. 13 description are preselected. In this example, the key points (1501) and (1502) are found to satisfy a defined relationship between the angles (1503) and (1504) to the line connecting these key points and also the requirement that the key points should be in a pre-defined distance to each other. It is important to note that the absolute distance is irrelevant here, which creates a powerful scale invariant descriptor. The cross-section (1505) along the line connecting the key points (1501) and (1502) in the design element "BRAND" is extracted, said cross-section (1505) representing a sparse signal. Actually, an even more sparse representation can be obtained if the cross-section is differentiated by the first order or second order derivative or equivalent high-pass filter. In this case, only the edges of the design elements will represent large magnitudes. The sparsity is important for efficient compression of the extracted features into a low dimensional vector. The resulting signal is normalized in step (1506) of FIG. 19 to obtain a norm equalling 1. This represents invariance to amplitude deviations caused by different imaging conditions. The normalized signal is resized to a fixed length in step (1507) of FIG. 19. The normalization is done at both the enrollment and identification stages. In this case, the length of signal is invariant to design as well as to scaling. This operation is information lossy since the information about the absolute length is lost. However, in case of ambiguity, it can be stored separately for final validation. At this stage, it is important to produce fast, reliable and invariant identification. The resulting signal is transformed to some domain in step (1508). The transform T should reduce the dimensionality of vector (1505). It can be a random projection transform (RPT) or any transform like DFT, DCT or DWT. The advantage of RPT is that the resulting transformed signal (1509) will be independent and identically distributed with a distribution closely following the Gaussian probability density function (PDF). In addition, the RPT can be based on a secret key that might be an essential element in the security of the scheme. Furthermore, the transformed signal (1509) is quantized in step (1510) of FIG. 19 by a vector quantization VQ that represents a product of vector quantizers trained on multiple signals using k-means algorithm in each block stored in the codebook $C_q$. Each product VQ produces a binary index of defined length. For security reasons, the dithered vector quantizer can be used with a dither vector generated from a secret key. All binary indices are concatenated together thus producing a final index (1511) which is a very short, binary, invariant descriptor of the image, in the present example of the logo "BRAND". It is possible to produce several descriptors from the same image, respectively design, and store these descriptors jointly as redundant representations of the design. At the same time, different criteria can be used to define the part of design that will be used for the feature extraction. According to the semantic hierarchical framework presented in the context of FIGS. 16, 17, and 18, the descriptors can be first deduced for each individual semantic element, e.g. a letter, then groups of these elements, and finally the entire design like illustrated in FIG. 19.

Figure 20:
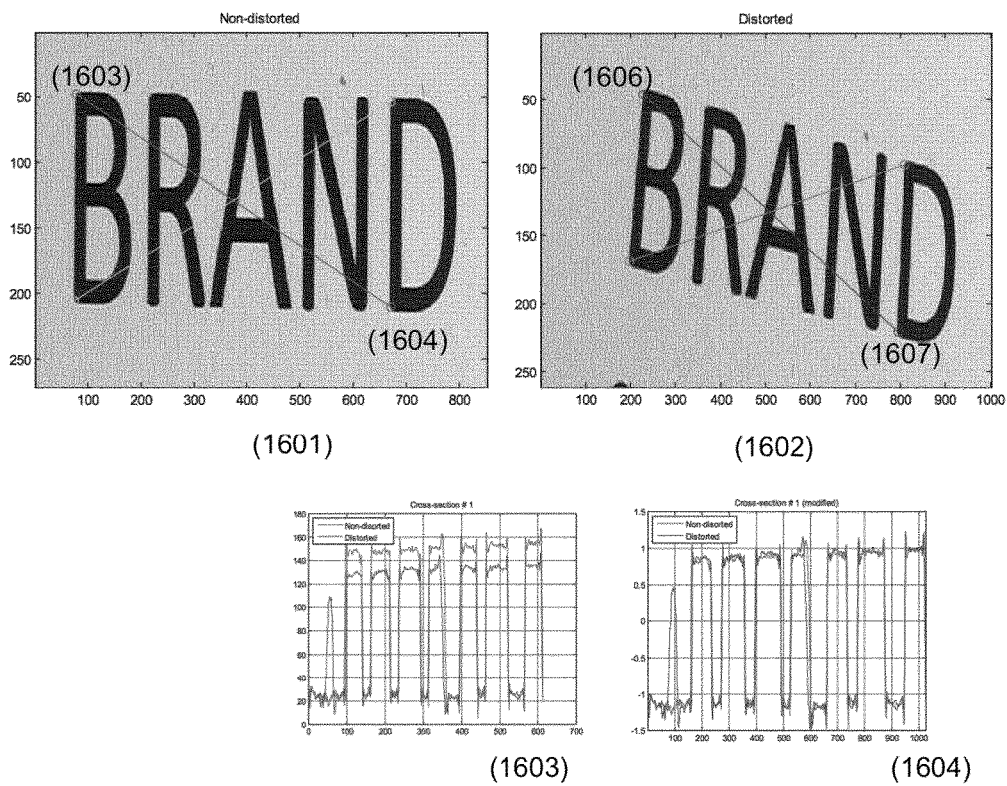
FIG. 20 shows an example of the framework presented in FIG. 19 applied to images acquired by mobile phone.

FIG. 20 shows an example of the framework presented in FIG. 19 applied to images acquired by mobile phone. The image (1601) represents an original design while (1602) corresponds to a probe acquired by mobile phone under projective transformation. Two cross-sections (1603) and (1604), respectively (1605) and (1606) are extracted in each of the images and are shown in a common plot (1603). The corresponding normalized curves are shown in plot (1604). Despite of different imaging conditions, these plots expose a remarkable similarity. Therefore, the resulting binary indices produced by each block of product VQ are very robust to geometrical variations and at the same time provide a unique characterization of the design.

Figure 21:
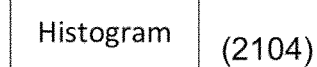
FIG. 21 shows an example of similar feature extraction like in FIG. 20 applied to a text document.
Figure 21:
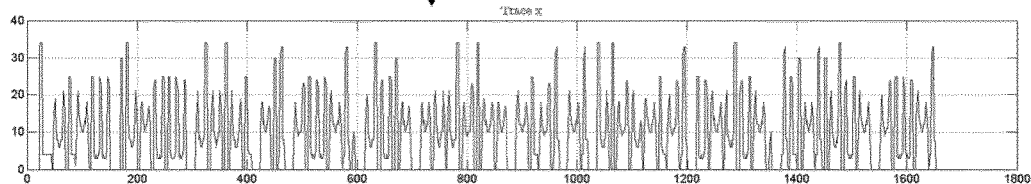
Figure 21:
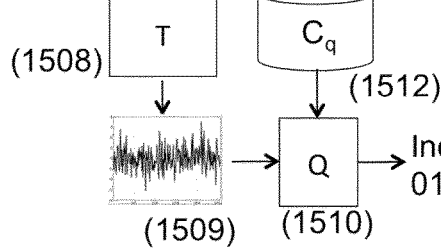
Figure 22:
FIG. 22 shows an example of the same framework applied to images.
Figure 22:
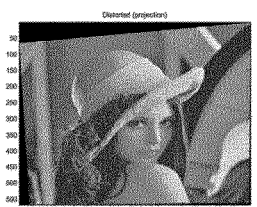
Figure 22:
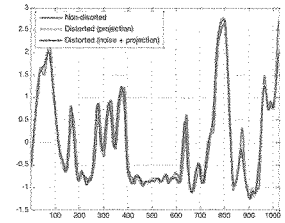
Figure 22:
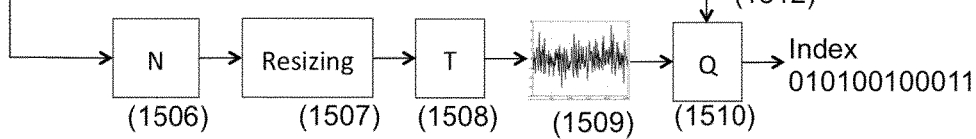

FIG. 21 illustrates the framework presented in FIG. 19 applied to a text document and FIG. 22 to real images. In FIG. 21, a given document is pre-aligned as a whole such as explained in the context of FIGS. 9 and 10 and segmented on lines. A line of text document (2101) such as illustrated exemplarily in FIG. 21 is passed through the feature extraction step (2) according to FIG. 4. The feature extractor computes a histogram (1505) based on a horizontal line through the letters of the line of text which results into a high-dimensional signal (2102). The transform T (1508) computes a corresponding low-dimensional signal (1509), which is quantized in step (1510) of product vector quantization VQ. The resulting index (2104) is stored in the database $D_i$ and represents the text document. In FIG. 22, the processing steps are equivalent to FIGS. 20 and 21. Multiple key points can be extracted from an original image (1601). The cross-sections are extracted from different combinations of key points with pre-defined constraints on the geometrical parameters of the key point locations and their descriptors. Whilst conventional local descriptors provide a local characterization of images that is not always informative when the same elements or design elements or letters are repeated multiple times in many images, the multilevel descriptors proposed by the present invention is very discriminative and informative. To demonstrate the robustness of said descriptors to projective transformations and noise, a pair of key points satisfying the predefined requirements to their local descriptors is chosen and the image is read out along the line (1601) indicated in FIG. 22 connecting said pair of key points. The same key points are selected on a reproduction of this image (2201) that was, however, distorted based on a projective transform with the addition of Gaussian noise. The cross-sections shown in plot (2202) expose a remarkable similarity. To compensate local shifts between the cross-sections caused by complex projective transforms, a block-wise cross-correlation is applied to find the best alignment during the quantization step (1510).

Figure 23:
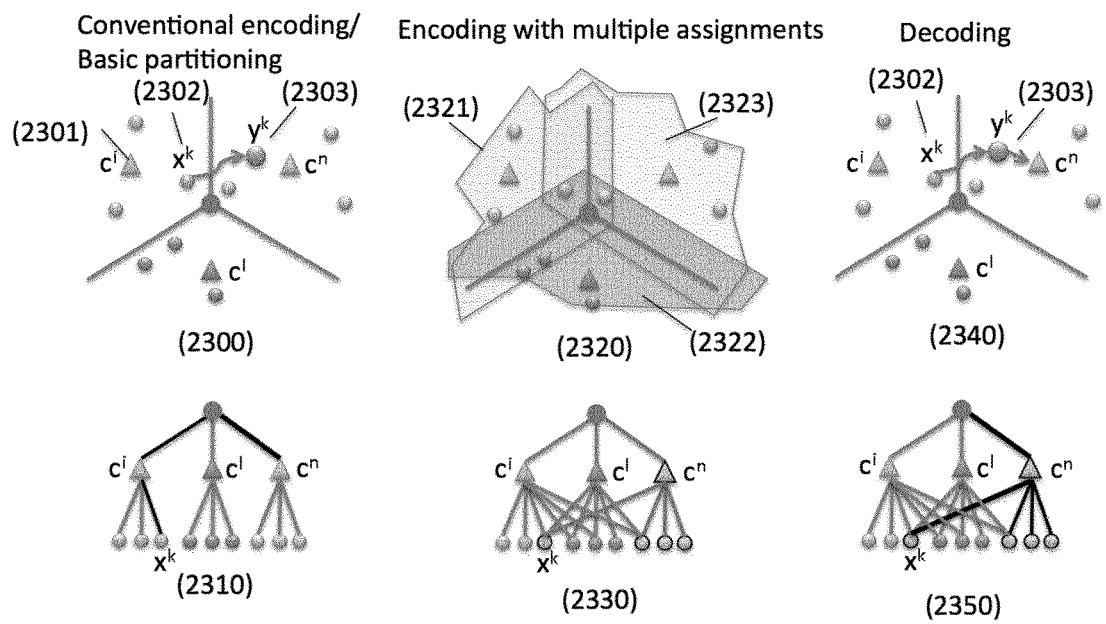
FIG. 23 illustrates in schematic manner a further embodiment of a feature encoding framework according to the present invention.

According to the present invention, each image is represented by multiple descriptors and the databases might contain features representing millions of images. To ensure fast and accurate identification, the above considered features should be appropriately encoded and indexed. FIG. 23 illustrates in schematic manner a further embodiment of a feature encoding framework. In fact, any features produced such as described above in a real or binary form should be encoded to produce a fast and reliable matching. In conventional encoding represented on the left part of FIG. 23 by steps (2300) and (2310), k-means clustering of features $x^k$ (2302), $1<=k<=K$, into a set of centroids $c^i$(2301), $1<=i<=I$, is used. The features that belong to the same centroid are grouped and ordered into a tree structure in step (2310). The main problem with this encoding consists in the noisy nature of probe features. In fact, if the feature $y^k$ (2303), which represents a noisy counterpart of $x^k$ (2302) corresponding to acquisition distortions and originally belongs to the cluster represented by the centroid $c^i$, it may erroneously be flipped to the centroid $c^n$, like indicated by an arrow in FIG. 23. The conventional matching algorithm first matches the feature with a set of centroids and then looks for the closest match among the features stored in the branches of the identified centroid, according to the tree structure built in step (2310). Since the noise due to to acquisition distortions flipped the feature $y^k$ to the closest centroid $c^n$, the conventional search procedure fails to find the right feature in the corresponding branch of the original centroid $c^i$. To overcome this problem, several centroids should be explored simultaneously which is known as multi-query extension and leads to an increased complexity of the matching step. A codebook organization such as presented on the middle part of FIG. 23 in steps (2320) and (2330) resolves these problems. This encoding shall in the following be referred to as multiple assignment encoding. If the feature is close to the separation boundary between two cells, it is considered as a candidate having a high flipping probability. Therefore, overlapping regions (2321), (2322) and (2323) are created at the separation boundaries between neighboring centroids. The features belonging to these overlapping regions are encoded as if they were belonging to all of the corresponding centroids in encoding step (2330); i.e. these features are assigned multiple times to the neighboring centroids. For example, a feature $x^k$ might be simultaneously attributed to several centroids. If the acquisition distortions flip the feature $x^k$ (2302) to $y^k$ (2303) like shown in (2340), the nearest centroid $c^n$ is found. According to decoding step (2350), all features belonging to the centroid $c^n$ will be checked out to find the feature which is the closest one as compared to $y^k$. Like illustrated schematically in encoding step (2330) and decoding step (2350), in this case, the feature $y^k$ is not missed during the decoding step (2350) according to the present invention, because the feature $x^k$ having a high flipping probability had been attributed to centroids $c^i$, $c^j$, and $c^n$ during the encoding step (2330), contrarily to the conventional encoding based on k-means clustering illustrated in (2310). This advantage is achieved by only a slight increase in memory use on the device performing these operations.

Figure 24:
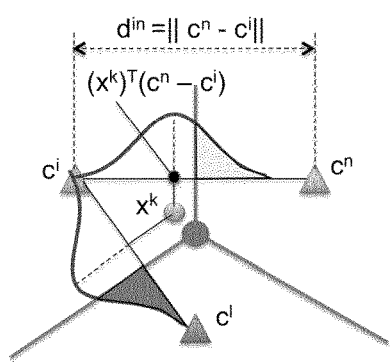
FIG. 24 schematically illustrates a concept of using feature reliability with respect to features situated in the overlapping regions between the centroids in the feature encoding framework according to FIG. 23.

In order to decide on the importance of features near the boundaries between the centroids in the above described feature encoding framework according to FIG. 23, it is possible to use the feature reliability for efficient encoding in that respect, this concept being schematically illustrated in FIG. 24. If the feature $x^k$ is closer to the decision boundary, it is more likely that it will be flipped due to distortions. The region of possible deviations around the feature $x^k$ may be assumed to be a sphere with a radius Lsigma, where L denotes the dimensionality of feature $x^k$ and sigma stands for the variance of equivalent noise. The Euclidian/Hamming distance between two centroids $c^n$ and $c^i$ is defined as $d^{in}=\|c^n-c^i\|$. The reliability function that corresponds to the probability of flipping the feature $x^k$ from the centroid $c^i$ to the centroid $c^n$ is then defined as $R^{in(k)}=Q(((x^k)^T(c^n-c^i)-d^{in}/2)/\text{sigma})$, where $(x^k)^T(c^n-c^i)$ represents a projection of $x^k$ onto the line $(c^n-c^i)$ and $d^{in}/2$ corresponds to the half distance between two centroids with the Euclidian/Hamming distance between two centroids $c^n$ and $c^i$ is defined as $d^{in}=\|c^n-c^i\|$. This reliability function can be introduced as a weight into step (2350) illustrated in FIG. 23. In this case, features having high reliabilities are given priority and high weights in decoding and matching.

3.2. Alignment

Figure 25:
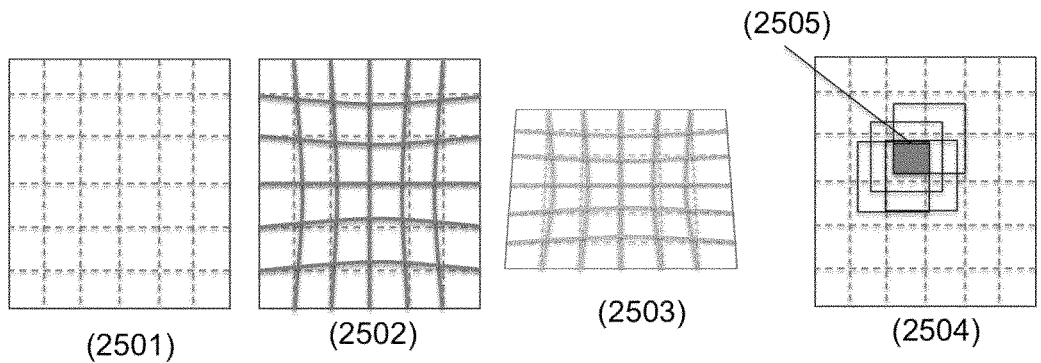
FIG. 25 illustrates typical distortions occuring in mobile imaging, particularly on mobile phones equipped with cameras.

Once an object under verification is identified according to the above explanations, in particular in the context of steps (2), (15), and (16) of FIGS. 4 and 5, the template of the object which probably corresponds to the object under verification is retrieved. However, to perform the authentication with high precision it is necessary to perform an accurate alignment such as mentioned in the context of step (402) of FIG. 4. This should ensure distinguishability between, on the one hand, a real mismatch between a fake and the authentic template and, on the other hand, distortions caused by the acquisition process with mobile phone imaging. FIG. 25 illustrates some typical mobile distortions occurring in mobile imaging, particularly on mobile phones equipped with cameras. Such distortions include lens distortions and projective transformations which distort an original grid (2501) such as shown in (2502), respectively (2503). The overall effect is highly non-linear. However, each cell might be approximated as a local projective or affine transform with its own parameters. Accordingly, a matching procedure adapted to deal with such distortions may be based on multiple partitions of the image to be synchronized such as shown in part (2504) of FIG. 25. Each block of partitioning is aligned with the corresponding part of a template based on local features. The local features are stored in encoded form as explained above. However, since the partitioning is random it does not guarantee that the local approximation exactly follows the assumed affine or projective transforms. Therefore, at the authentication stage, the object region (2505) covered by several overlapping blocks is considered to be authentic if at least one block satisfies a pre-defined measure of similarity. If no such block can be found, the region is considered to be non-authentic. In practice, mobile imaging with an alignment such as described above can ensure a precision of about 10 micrometers, based on a mean camera resolution of which nowadays mobile phones dispose.

3.3 Authentication

The authentication is the final stage of the verification procedure illustrated in general in FIG. 4. The authentication features $y_a$ extracted from the acquired image y are aligned with the features $x_a(m')$ obtained from the authentication database $D_a$ in the alignment step (402) explained above, thus resulting in aligned authentication features $y_a'$. The final decision about the correspondence of these features is performed in the authentication step (12) of FIG. 4. The system decides about the level of correspondence between the features $y_a'$ and the templates $x_a(m')$ and produces an overall decision on authenticity or displays a difference plot highlighting the major differences between these features. The decision about the authenticity of the probe object can be made based on the analysis of the direct difference between the aligned image and the corresponding template and its comparison with some threshold. Generally, such a strategy gives very good tamper detection results given proper feature alignment. However, the storage of templates in the form of bitmap images is memory consuming and highly insecure, and it should be ensured that the templates will not be in the disposal of potential infringers. Therefore, depending on the granularity of the authentication process, it is preferable to deduce such template features $x_a(m')$ that allow reliable detection of differences and at the same time that can be stored and distributed both efficiently and securely. For these reasons, in one embodiment of the method, the authentication features $x_a(m')$ represent the same class of features like the ones used for the identification with the difference that they are extracted to a lower level of granulatity, e.g. in the block-wise or semantic manners as described above. This makes the process of image description universal and scalable to a particular granularity depending on the needs of a particular application. For example, the object can be quickly identified with the help of the several features computed at a coarse level and then the design can be authenticated based on features computed at a fine level.

Figure 26:
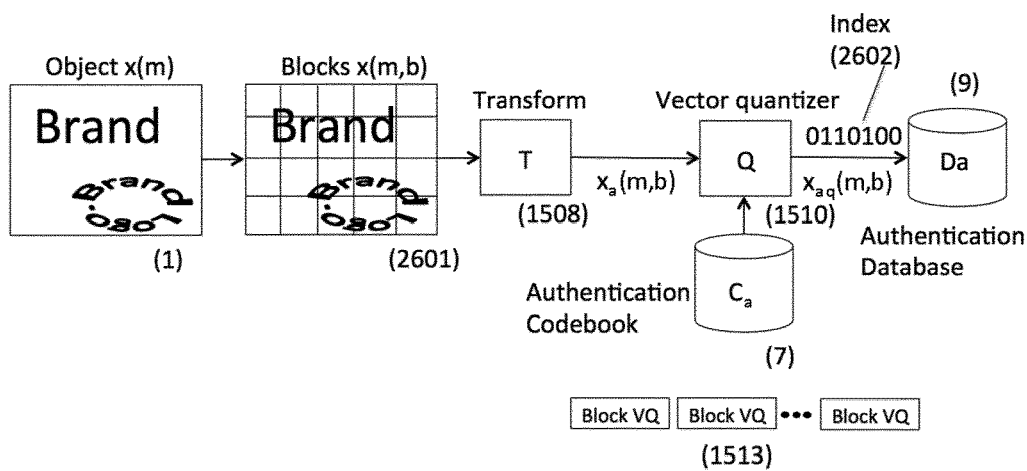
FIG. 26 illustrates the enrollment step for the authentication corresponding to FIGS. 2 and 3.
Figure 27:
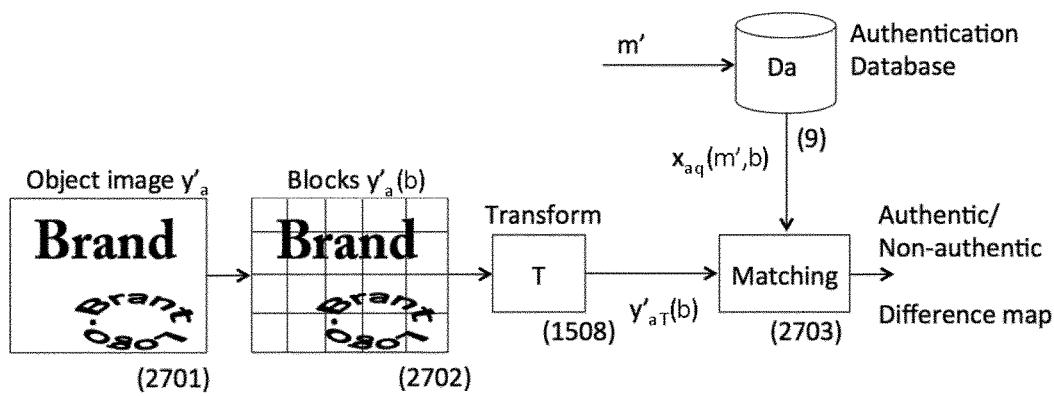
FIG. 27 schematically illustrates the authentication step corresponding to step (12) in FIG. 4.

In one embodiment of the method according to the present invention, the authentication process as a whole comprises enrollment and authentication steps such as schematically illustrated in FIGS. 26 and 27, respectively. FIG. 26 illustrates the enrollment step for the authentication such as briefly mentioned in the context of FIGS. 2 and 3. An image (1) of a given object $x(m)$ is partitioned into blocks to cope with the above mentioned non-linear distortions such as presented in FIG. 25. This results in image (2601) with each block denoted $x(m,b)$, where m stands for image index and b denotes the block, $1<=b<=B$. Each block is processed by a transform T in step (1508), thus resulting into a feature vector $x_a(m,b)$. This feature vector is quantized in step (1510) by vector product VQ using the authentication codebook $C_a$, based on a set of block VQs (1513), resulting into a quantized feature vector $x_{aq}(m,b)$ which can be represented as an index (2602), which is stored in the authentication database $D_a$ in step (9) of FIG. 4, respectively 26.

The authentication step corresponding to step (12) in FIG. 4 is schematically illustrated in FIG. 27. Given the acquired image y represented by its aligned authentication features $y'_a$, and the index m' produced at the identification step (11) in FIG. 4, the authentication starts with partitioning the image y into blocks such as depicted in step (2702) of FIG. 27. Each block is processed individually in step (1508) by a transform T resulting into a corresponding feature vector $y'_{aT}(b)$. This feature vector is matched with the vector $x_{aq}(m',b)$ stored in the authentication database $D_a$ and corresponding to said index m' during the matching step (2703) which produces a decision about the level of their similarity. The procedure is repeated for all bocks B and the global decision whether the image y, respectively the corresponding digital—or physical object, can be unambiguously identified and thus can be declared to be authentic is made.

Figure 28:
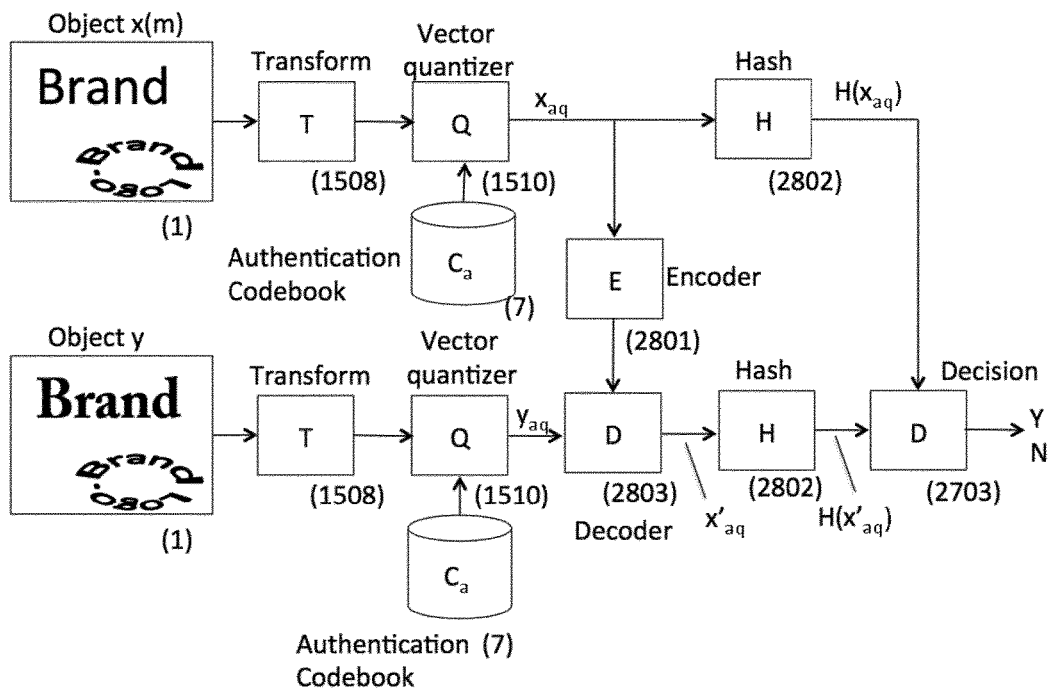
FIG. 28 illustrates a secure implementation of the authentication framework presented in FIGS. 26 and 27.

In another embodiment, the above described authentication can be secured such as shown in FIG. 28. The security of this scheme is based on the fact that the original authentic features $x_a$ are not stored in an open format but instead shall be protected by cryptographic functions like a hash H. For the following, it will be assumed that image $x(m)$ of a corresponding digital—or physical object to be protected and an acquired image y of an object to be authenticated are synchronized according to the previously described procedures, in particular according to FIGS. 26 and 27. The transform T and product vector quantization VQ are applied in steps (1508), respectively (1510) of FIG. 28 and produce the corresponding quantized representations of these images denoted as $x_{aq}$ and $y_{aq}$. The vector $x_{aq}$ representing the authentication features $x_a(m)$ of image $x(m)$ is processed in two ways. On the one hand side, a secure hash H is computed in step (2802), denoted as $H(x_{aq})$ in FIG. 28. However, in general, $H(x_{aq})$ is not equal to $H(y_{aq})$ even for one bit mismatch. To ensure that these hashes coincide even for the small level of distortions caused by the acquisition process, additional information is shared. To this effect, on the other hand side, an encoder E produces in step (2801) extra bits needed for the errorless recovery of vector $x_{aq}$ based on vector $y_{aq}$. In step (2803), a decoder D observes these bits together with the noisy vector $y_{aq}$ representing the authentication features $y_a$ and extracted from the acquired image y, such as to produce an accurate estimate $x'_{aq}$ of vector $x_{aq}$, respectively of the hash $H(x_{aq})$ by computing in step (2802) secure hash $H(x'_{aq})$ based on estimate $x'_{aq}$. If the distortions do not exceed a certain pre-defined level, the decoder is capable to correct all bits based on correction bits from the encoder. This results into $x'_{aq}=x_{aq}$ thus $H(x'_{aq})=H(x_{aq})$ which indicates authenticity of the image, respectively of the corresponding object. Otherwise, a mismatch of the hashes serves as an indication of non-authenticity of the object under verification. This final decision about the hash mismatch is made in step (2703). The security of this scheme is ensured by the secure, non-invertible properties of the hashes H and inability to deduce the information about the original data from the assisting bits used for the recovery of the authentication features $x'_{aq}$. Additionally, transform T (508) can be key based. The described method can be applied to any authentication features explained above or to a combination of these. The hashes and error correction bits can be publicly distributed, shared or even outsourced to third party services without any risks that the disclosed data can be used for the reproduction of faked products.

Figure 29:
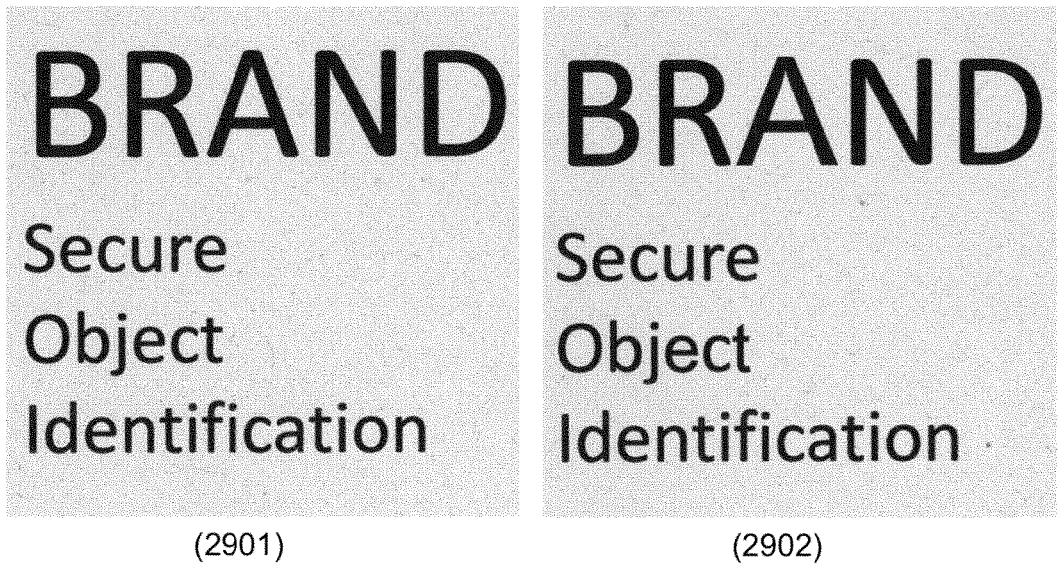
FIG. 29 illustrates the application of the proposed method to authentication of printed text acquired by mobile phone.
Figure 30:
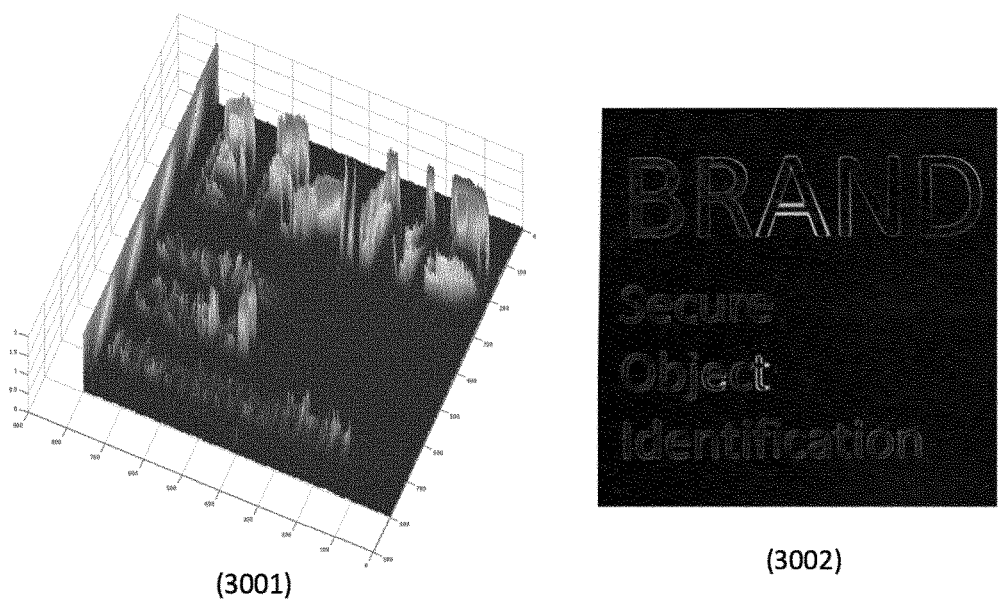
FIG. 30 shows the differences between the original image and the faked image of FIG. 29 in three-dimensional-and two-dimensional manner.

FIGS. 29 and 30 illustrate the application of the described methods to authentication of printed text acquired by mobile phone. In FIG. 29, image (2901) represents an original object while image (2902) corresponds to a counterfeited object reproduced by use of image (2901) under modification of letter "A" in the word "BRAND" and modification of letters "e" and "t" in the word "Object" by replacement of their fonts. The font replacement in the word "BRAND" also causes a change of spacing between the letters. All these modifications are hardly visible by naked eye. Image (2902) was printed and acquired by mobile phone. FIG. 30 shows the differences between the original image (2901) and the faked image (2902) of FIG. 29 in three-dimensional-(3001) and two-dimensional manner (3002), the differences being represented by the features according to the method described in the context of FIGS. 26 to 28. The introduced modifications are clearly visible and the authentication step (2703) of the method illustrated in FIG. 28 produces the correct decision that there is no correspondence between the objects represented by images (2901) and (2902). This indicates that the authentication procedure based on block-wise local projective approximations such as explained with respect to FIG. 25 is very accurate and robust as well as adapted for lenses used in mobile phones and the corresponding projective distortions, such that the authentication algorithm is very sensitive even to minor differences in the object design. The overall decision about authenticity can be made by analysis of an acceptable level of differences. In most cases, such differences appear in the regions of mismatches between text characters and they possess a high correlated structure or large variability. Such kind of differences can easily be detected based on connectivity analysis or comparing the local variances with some threshold. In case of text documents, good results are also obtained even for lossy compressed or downsampled images. In addition the differences between the aligned blocks can be computed and their absolute values sorted. The analysis of the k largest coefficients, considered as order statistics, is quite indicative with respect to the level of differences between the images. In this case, the spatial structure of the differences may not be taken into consideration and the decision may be made based on the analysis of the quantity of differences. In another embodiment, the hybrid decision about the spatial correlation of differences is based on the selection of k largest differences and analysis of their local correlated structure.

Figure 31:
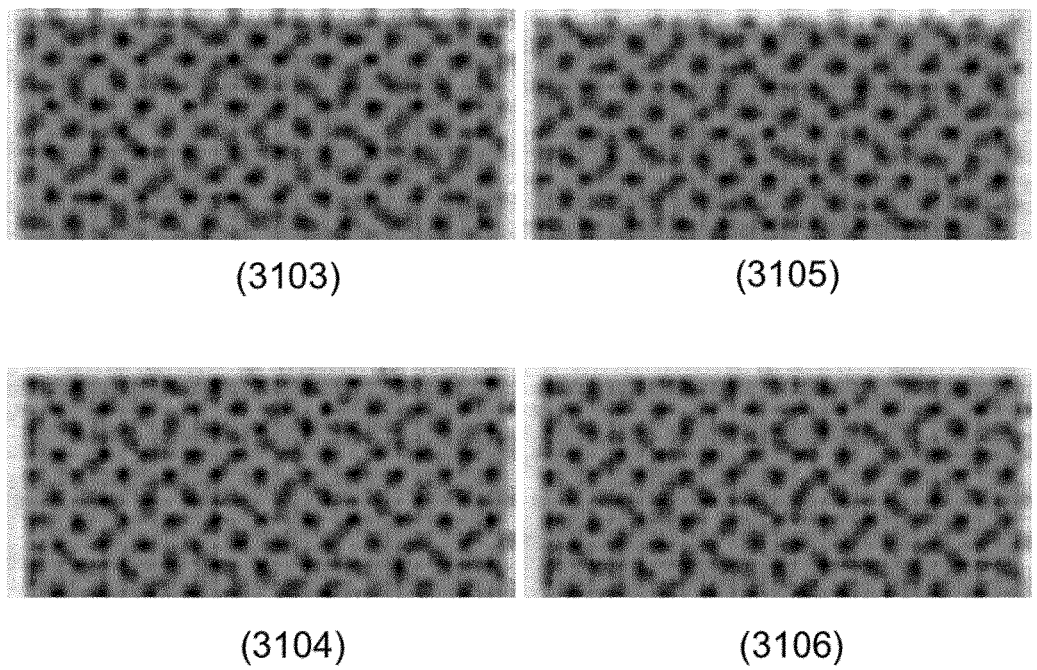
FIG. 31 illustrates the ability of the method according to the present invention to detect differences in the halftone patterns which are invisible to the human eye.
Figure 32:
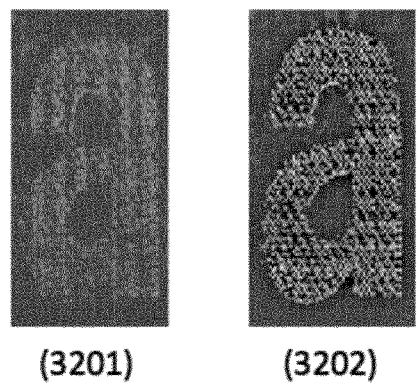
FIG. 32 shows the differences between the images shown under magnification in FIG. 31 such as detected according to the method illustrated schematically in FIGS. 26-28.

FIGS. 31 and 32 demonstrate the ability of the method according to the present invention to detect differences in the halftone patterns of images which are invisible to the human eye. In FIG. 31, the letter "U" was printed two times on the same professional printing equipment using the same ink, halftone pattern and the same level of accuracy in tuning. The resulting first and second printed images have each been acquired two times by mobile phone cameras resulting in acquired images (3103) and (3105), corresponding to the first printed image, respectively (3104) and (3106), corresponding to the second printed image. These images are shown with magnification to highlight the differences in the halftoning. Obviously, the images acquired from the same printed image, e.g. (3103) and (3105), respectively (3104) and (3106), look very similar. At the same time, there is a significant difference between the halftone patters acquired from different images, e.g. (3103) and (3104), respectively (3105) and (3106). However, the naked human eye cannot distinguish the differences between the halftone patters without direct comparison. The method according to the present invention is able to detect these differences with high precision. In FIG. 32, the level of mismatch between the images (3103) and (3105) acquired from the same image printed first is negligible, such as illustrated by difference plot (3201), in comparison to the level of mismatch between the images (3103) and (3104) acquired from different printed images, such as shown as by difference plot (3202). The proposed method thus is able to clearly detect any non-correspondence in images on microscopic level even when the images are acquired in non-synchronized way by mobile phone.

The present invention is also directed to computer program means stored in a computer readable medium which are adapted to implement the above proposed method as well as to a device adapted for implementation of such a method. A corresponding device may consist in a mobile phone, in particular a smart phone equipped with a camera, a digital photo apparatus, a digital video camera, a barcode reader equipped with a camera, or any other mobile or stationary device which can be equipped with corresponding software such as to allow the user of the device to perform the method. Typical stationary devices which are adapted for implementation of a method according to the present invention are e.g. flatbed scanners, which would allow these devices to perform a verification of the scanned text and/or image. In fact, as far as the mobile or stationary device is equipped with a camera or another image acquisition facility, the corresponding software implementing the proposed method, and an Internet connection providing access to the databases used by the method, the user can directly make use of the recognition and/or authentication method according to the present invention.

Furthermore, it is clear that use of the method disclosed herein may be made in a plurality of applications, in particular for the protection of digital media, also if reproduced in analog form, and/or of printed documents, for recognition and/or authentication of digital—and/or physical objects, for content and/or object authentication and/or identification, detection of local modification, as well as object and/or content related management, tracking, tracing and/or monitoring. Particularly interesting fields of application are the rapid and simple protection and verification of banknotes, recognition of objects in commerce, e.g. in assistance to or replacement of barcode readers used in supermarkets. By the way, the proposed method may, for certain types of applications, be limited to a rapid identification of the object under verification, e.g. if the required level of confidence doesn't require verification of authenticity. In such rare cases, the authentication step may be skipped. In general, the present invention allows to provide protection for any kind of digital objects as well as for physical objects like packaging, documents, luxury goods like watches, and electronics. In addition, any inherent deviations in manufacturing of banknotes linked to their ID numbers, or to the production of the same design produced on different machines and in different countries can be enrolled, such as to be used for the authentication as an additional security feature. Moreover, the different modulation and watermarking technologies leaving a unique trace in the product design reflected in vector graphics or text symbologies reproduced by various means like images or barcodes can be efficiently used for verification even without knowing the explicitly used technology or encoded information. Therefore, the verification can be applied to both marked and non-marked object, thus creating a unique backward compatibility. In addition, the database of images representing the enrolled objects can be used for analysis and evaluating statistics of uploads of authentic objects as well as of fakes. In particular, the images can be classified according to the type of brands using the proposed identification. The images within one brand can be further clustered into sub-groups based on the similarity of their features. This information might be very useful to group all brands produced by authorized facilities and to distinguish them from those manufactured in illegal way. More particularly, grouping and analyzing of fakes might reveal very important information on how many illegal producers are on the market and in which regions they distribute their products, or any similar information. This allows to estimate the scale and geographic distribution of faked products and eventually even to trace corresponding supply chains.

In light of the above description of the structure and of the operating mode of the present invention, its advantages are clear. Primarily, the method according to the present invention allows to realize detection of microscopic differences between a known authentic template image attributed to a specific digital—or physical object and an acquired image, in particular acquired by mobile phone cameras, attributed to an object under the investigation. This forms the main idea behind the present invention and has an enormous potential in the context of secure recognition and authentication of objects of all type. Its interest is increased by the fact that the recognition and/or authentication may directly be performed by the end consumers who are in position to simply use the method on their own devices, given that neither specific know-how nor equipment is necessary once their mobile phone is equipped with a camera, the corresponding software, and an internet connection providing access to the databases used by the method. Moreover, the proposed approach benefits from the fact that modern smart phones represent powerful platforms with imaging, computational and communication facilities. Indeed, the computational power and memory of these devices currently achieve about tent percent of those of modern desktop computers, such that by carefully designing the corresponding algorithms for the proposed method it has become possible to cope with complexity and storage restrictions even on mobile devices. Therefore, performing such verification on the portable devices of end consumers is extremely attractive both for brand owners and for consumers. In addition, such functionality can be considered as a perfect market analysis tool, because information from verifications performed by end consumers could be stored and analyzed, e.g. to contribute towards accurate and fast information on geographical trends in appearance and distribution in counterfeiting goods as soon as such items enter the market. The protection is achieved by means of registering and encoding the features of the original object design, thus enabling very accurate and fast verification of the correspondence between the features of the object under the inspection to those of the original object. These features can be accurately extracted from the images acquired by the portable devices using the alignment end encoding according to the present method. Also, this approach provides a non-invasive automatic verification given the fact that modification of the objects to be protected, respectively of its manufacturing process are not required. For these reasons and advantages, the method of recognition and/or verification of authenticity according to the present invention based on image acquisition by portable devices is of great interest.

The invention claimed is:

1. A method for recognition and verification of authenticity of digital and/or physical objects comprising:
   a codebook training step comprising:
   providing a training set of images $x(1), \ldots, x(T)$ consisting of T training images,
   extracting for each image $x(1), \ldots, x(T)$ identification features $(x_1(1), \ldots, x_1(T))$ and authentication features $x_a(1), \ldots, x_a(T)$),
   applying vector quantizers to said identification features $(x_1(1), \ldots, x_1(T))$ and authentication features $x_a(1), \ldots, x_a(T)$) to obtain corresponding sets of identification and authentication centroids, and
   registering said sets of centroids in an identification codebook ($C_i$) and authentication codebook ($C_a$),
   an object enrollment step comprising:
   acquiring an image $x(m)$ of a digital of physical object x to be protected directly from the physical object x or from an electronic file, using an acquisition device,
   extracting identification features $x_i(m)$ and authentication $x_a(m)$ from image $x(m)$,
   enrolling and storing said identification features $x_i(m)$ in an identification database ($D_i$) and said authentication features $x_a(m)$ in an authentication database ($D_a$),
   repeating said acquiring, extracting, and enrolling steps for each object to be protected,
   an object verification step comprising:
   acquiring an image y of an object under verification using the acquisition device,
   extracting identification features $y_i$ and authentication features $y_a$ from image y,
   identifying object y by producing an estimate of the object index m' referring to the identification database ($D_i$) of enrolled identification features ($x_i(m')$) by using an inverted file to match the identification features ($y_i$) extracted from the acquired image y with the identification features ($x_i(m')$ stored in the identification database ($D_i$),
   aligning the authentication features ($y_a(m')$) extracted from the acquired image y with the enrolled authentication features ($x_a(m')$) of the object estimate m', resulting in aligned authentication features ($y'_a(m')$),
   authenticating the object by comparing the aligned authentication features ($y'_a(m')$) of the acquired image y with the enrolled authentication features ($y'_a(m')$) obtained from the authentication database ($D_a$), using the estimate of the object index m',
   repeating said extracting, identifying, and authenticating steps for each object to be recognized and/or authenticated,
   the method using two types of features ($x_i(m), x_a(m)$), of codebooks ($C_i, C_a$), and of databases ($D_i, D_a$) which are specifically designed for identification, respectively authentication, the identification database $D_i$ and authentication database $D_a$ having different organizations.

2. The method according to claim 1, wherein the identification database $D_i$ is designed as an inverted file with an identification feature ($x_i(m)$) with a given index m containing the corresponding indices of objects possessing this feature, whilst the authentication database $D_a$ is designed as a lookup table storing at index m the authentication features ($x_a(m)$) of an object with an attributed index m.

3. The method according to claim 1, wherein the step of extracting the identification features ($y_i$) from image y comprises an optional step of global alignment as well as the steps of key points extraction and computation of descriptors.

4. The method according to claim 1, wherein the step of extracting the identification features ($y_i$) from image y comprises determining descriptors ($y_d$) at positions defined by a set of key points ($y_k$) in an aligned image $y_{all}$ of image y and combining said key points ($y_k$) and their descriptors ($y_d$) into a compact form corresponding to said identification features ($y_i$).

5. The method according to claim 4, wherein said descriptors are chosen from the group comprising an angle between the gradient at a key point and the nearest design element in clock-wise order, distances between given key points and/or their ratios, features extracted along a virtual connecting line between given key points, in particular ratios between black and white and/or otherwise differently colored regions and/or between the positions of crossing points, ratios between angles formed between the gradients and said connecting line between given key points, ratios of all angles and distances between all local descriptors, all preferably represented in quantized manner by encoding based on Gray labelling.

6. The method according to claim 1, wherein the identification features ($x_i(m), y_i$) are organized into a specific semantic hierarchical feature structure by sequential, semantic, block-based, and/or distance-based combination of the identification features extracted from individual elements at several hierarchical levels.

7. The method according to claim 1, wherein extracting the identification features ($y_i$) from image y corresponding to an object under verification is performed based on hierarchical semantic organization, the identification features ($y_i$) being extracted from the image y by use of at least one level decoder producing a list of possible candidates $L_1(y)$ matching best at each level representation according to each level codebook in order to produce an estimate of the most likely index m' of the object enrolled in the identification database which probably corresponds to the object under verification.

8. The method according to claim 1, wherein the identification features $x_i(m)$ extracted from image $x(m)$ during the enrollment step and the identification features $(y_i)$ extracted from an acquired image y are encoded by applying a transformation to a domain by random projection transform (RPT) or another transform such as DFT, DCT or DWT, and quantization such as to produce a binary index representing a feature or a set of features.

9. The method according to claim 1, the identification features $x_i(m)$ extracted from image $x(m)$ during the enrollment step and the identification features $(y_i)$ extracted from an acquired image y are encoded by applying multiple assignment by creating overlapping regions at the separation boundaries between neighboring centroids ($c^i$, $c^j$, $c^n$) and attributing features ($x^k$) belonging to these overlapping regions to all of the corresponding centroids ($c^i$, $c^j$, $c^n$) both in the encoding and decoding steps, the overlapping regions being defined using a reliability function $R^{in(k)}=Q(((x^k)^T(c^n-c^i)-d^{in}/2)/sigma)$ corresponding to the probability of flipping a given feature $x^k$ from centroid $c^i$ to centroid $c^n$, where $(x^k)^T(c^n-c^i)$ represents a projection of $x^k$ onto the line $(c^n-c^i)$ and $d^{in}/2$ corresponds to the half distance between two centroids with the Euclidian distance between two centroids $c^n$ and $c^i$ being defined as $d^{in}=\|c^n-c^i\|$, said reliability function $R^{in(k)}$ being used as a weight at least for the features near the boundaries between the centroids of neighboring centroids ($c^i$, $c^j$, $c^n$).

10. The method according to claim 1, wherein aligning the authentication features $(y_a)$ extracted from the acquired image y with the enrolled authentication features $(x_a(m'))$ of the object estimate m', resulting in aligned authentication features $(y'_a)$, is performed by partitioning the acquired image y and aligning each partition with a corresponding part of a template image corresponding to the object estimate m' by use of a local projective transform based on local features of each partition.

11. The method according to claim 1, wherein the authentication features $x_a(m)$ extracted from image $x(m)$ during the enrollment step are encoded by partitioning said image $x(m)$ into blocks $x(m,b)$ and applying a transformation to some domain, by random projection transform (RPT) or another transform such as DFT, DCT or DWT, to produce a feature vector $x_a(m,b)$ as well as a quantization such as to produce a quantized feature vector $x_{aq}(m,b)$ which can be represented by an index stored in the authentication database.

12. The method according to claim 1, wherein the aligned authentication features $(y'_a)$ extracted from an acquired image y are processed by partitioning said image y into blocks y(b) and applying a transformation to some domain, by random projection transform (RPT) or another transform such as DFT, DCT or DWT, such as to produce a feature vector $y'_{aT}(b)$ which can be matched with a corresponding template vector $x_{aq}(m',b)$ obtained from the authentication database using the estimate of the object index m', such as to allow a decision on the authenticity of the object under verification corresponding to the acquired image y.

13. The method according to claim 11, wherein the quantized feature vector $x_{aq}(m,b)$ representing the authentication features $(x_a(m))$ extracted from image $x(m)$ is used to produce both a secure hash $H(x_{aq})$ and supplementary information needed for the errorless recovery of vector $x_{aq}(m,b)$, a decoder being adapted to observe these bits together with a noisy vector $y_{aq}$ representing the authentication features $(y_a)$ and extracted from the acquired image y, allowing the decoder to produce an estimate $x'_{aq}$ of vector $x_{aq}$, respectively an estimate $H(x'_{aq})$ of the hash $H(x_{aq})$ based on estimate $x'_{aq}$, such as to allow a decision on the authenticity of the object under verification by comparison of secure hash $H(x_{aq})$ and estimated hash $H(x'_{aq})$.

14. A computer program stored in a non-transitory computer readable medium adapted to implement the method according to claim 1.

15. A device adapted for implementation of a method according to claim 1, wherein the device is chosen from the group consisting of a mobile phone, a smart phone equipped with a camera, a digital photo apparatus, a digital video camera, a barcode reader equipped with a camera, a scanning device.

16. The use of a method according to claim 1 for an application chosen from the group comprising protection of digital media and/or of printed documents, recognition and/or authentication of digital and/or physical objects, content and/or object identification and/or authentication, detection of local modification, object and/or content related management, tracking, tracing and/or monitoring, in particular product identification and tracking in commerce, protection of physical objects such as packaging, digital and physical documents, in particular text and identity documents, luxury goods such as watches, and electronics, verification of banknotes.

17. The method of claim 1, wherein the acquisition device is a mobile phone equipped with a camera, a digital photo apparatus, a digital video camera, a barcode reader equipped with a camera, or a scanning device.

* * * * *